US010435199B2

(12) United States Patent
Niederst et al.

(10) Patent No.: US 10,435,199 B2
(45) Date of Patent: Oct. 8, 2019

(54) COMPOSITIONS FOR CONTAINERS AND OTHER ARTICLES AND METHODS OF USING SAME

(71) Applicant: SWIMC LLC, Cleveland, OH (US)

(72) Inventors: Jeffrey Niederst, Pittsburgh, PA (US); Richard H. Evans, Wexford, PA (US); Robert M. O'Brien, Monongahela, PA (US); Kevin Romagnoli, Coraopolis, PA (US); Mark S. Von Maier, Harmony, PA (US)

(73) Assignee: SWIMC LLC, Cleveland, OH (US)

( * ) Notice: Subject to any disclaimer, the term of this patent is extended or adjusted under 35 U.S.C. 154(b) by 0 days.

(21) Appl. No.: 16/057,469

(22) Filed: Aug. 7, 2018

(65) Prior Publication Data

US 2018/0346199 A1 Dec. 6, 2018

Related U.S. Application Data

(63) Continuation of application No. 14/616,175, filed on Feb. 6, 2015, now abandoned, which is a continuation of application No. PCT/US2013/054132, filed on Aug. 8, 2013.

(60) Provisional application No. 61/681,434, filed on Aug. 9, 2012.

(51) Int. Cl.
*B65D 25/14* (2006.01)
*B65D 81/34* (2006.01)
*C09D 171/00* (2006.01)
*C09D 171/12* (2006.01)
*C08G 65/26* (2006.01)
*C09D 163/00* (2006.01)

(52) U.S. Cl.
CPC .............. *B65D 25/14* (2013.01); *B65D 81/34* (2013.01); *C08G 65/2612* (2013.01); *C09D 163/00* (2013.01); *C09D 171/00* (2013.01); *C09D 171/12* (2013.01); *Y10T 428/1355* (2015.01)

(58) Field of Classification Search
USPC ....................................................... 428/35.8
See application file for complete search history.

(56) References Cited

U.S. PATENT DOCUMENTS

| | | | |
|---|---|---|---|
| 2,500,449 A | 3/1950 | Bradley | |
| 2,528,933 A | 11/1950 | Wiles | |
| 2,633,458 A | 3/1953 | Shokal | |
| 2,694,694 A | 11/1954 | Owen et al. | |
| 2,767,157 A | 10/1956 | Masters et al. | |
| 2,824,855 A | 2/1958 | Freeman et al. | |
| 3,006,891 A | 10/1961 | Leroy et al. | |
| 3,085,992 A | 4/1963 | Lee et al. | |
| 3,102,043 A | 8/1963 | Arthur et al. | |
| 3,121,727 A | 2/1964 | Baliker et al. | |
| 3,153,008 A | 10/1964 | Fox | |
| 3,220,974 A | 11/1965 | Fox | |
| 3,275,601 A | 9/1966 | Schnell et al. | |
| 3,288,884 A | 11/1966 | Sonnabend et al. | |
| 3,313,775 A | 4/1967 | Frankel | |
| 3,379,684 A | 4/1968 | Wiesner et al. | |
| 3,475,266 A | 10/1969 | Albert | |
| 3,477,990 A | 11/1969 | Mark et al. | |
| 3,480,695 A | 11/1969 | Warren | |
| 3,491,111 A | 1/1970 | Lin | |
| 3,491,112 A | 1/1970 | Lin | |
| 3,491,116 A | 1/1970 | Lin | |
| 3,509,174 A | 4/1970 | Lin | |
| 3,578,615 A | 5/1971 | Robert et al. | |
| 3,624,107 A | 11/1971 | Lin | |
| 3,627,787 A | 12/1971 | Lin | |
| 3,641,011 A | 2/1972 | Lin et al. | |
| 3,642,828 A | 2/1972 | Sheldon et al. | |
| 3,681,390 A | 8/1972 | Lin | |
| 3,775,424 A | 11/1973 | Farber | |
| 3,853,869 A | 12/1974 | Farber | |
| 3,876,606 A | 4/1975 | Kehr | |
| 3,879,348 A | 4/1975 | Serini et al. | |
| 3,888,812 A | 6/1975 | Plettner | |
| 3,905,926 A | 9/1975 | D'Alelio | |
| 3,920,510 A | 11/1975 | Hatano et al. | |
| 3,943,187 A | 3/1976 | Wu et al. | |
| 3,959,571 A | 5/1976 | Yahagi et al. | |
| RE28,862 E | 6/1976 | Siemonsen et al. | |
| 3,971,808 A | 7/1976 | Baumann et al. | |

(Continued)

FOREIGN PATENT DOCUMENTS

| | | | |
|---|---|---|---|
| CA | 2280409 A1 | 2/2001 | |
| CA | 2570312 A1 | 1/2006 | |

(Continued)

OTHER PUBLICATIONS

Application and File History for U.S. Appl. No. 13/651,796, filed Oct. 15, 2012, 68 pages, Inventors: Evans, et al.
Application and File History for U.S. Appl. No. 13/570,632, filed Aug. 9, 2012, Inventors: Niederst, et al, 1250 pages.
Application and File History for U.S. Appl. No. 14/453,203, filed Aug. 6, 2014, Inventors: Niederst, et al, 572 pages.
Application and File History for U.S. Appl. No. 15/204,559, filed Jul. 7, 2016, Inventors: Niederst, et al, 195 pages.
Application and File History for U.S. Appl. No. 15/290,765, filed Oct. 11, 2016, Inventors: Niederst, et al, 215 pages.
Application and File History for U.S. Appl. No. 15/803,127, filed Nov. 3, 2017, Inventors: Evans, at al. 227 pages.

(Continued)

*Primary Examiner* — Terressa Boykin
(74) *Attorney, Agent, or Firm* — Patterson Thuente Pedersen, P.A.

(57) ABSTRACT

This invention provides a polymer, which is preferably a polyether polymer. The polymer may be used in coating compositions. Containers and other articles comprising the polymer and methods of making such containers and other articles are also provided. The invention further provides compositions including the polymer (e.g., powder coatings), which have utility in a variety of coating end uses, including, for example, valve and pipe coatings.

33 Claims, No Drawings

(56) References Cited

U.S. PATENT DOCUMENTS

| | | |
|---|---|---|
| 3,984,363 A | 10/1976 | D'Alelio |
| 4,009,224 A | 2/1977 | Warnken |
| 4,011,184 A | 3/1977 | Van et al. |
| 4,051,195 A | 9/1977 | McWhorter |
| 4,076,676 A | 2/1978 | Sommerfeld et al. |
| 4,076,764 A | 2/1978 | Bauer |
| 4,111,910 A | 9/1978 | Baggett |
| 4,122,060 A | 10/1978 | Yallourakis |
| 4,172,103 A | 10/1979 | Cohen et al. |
| 4,173,594 A | 11/1979 | Dyszlewski |
| 4,212,781 A | 7/1980 | Evans et al. |
| 4,247,439 A | 1/1981 | Matthews et al. |
| 4,283,428 A | 8/1981 | Birkmeyer |
| 4,285,847 A | 8/1981 | Ting et al. |
| 4,333,809 A | 6/1982 | Schreckenberg et al. |
| 4,340,716 A | 7/1982 | Hata et al. |
| 4,368,315 A | 1/1983 | Sikdar |
| 4,374,233 A | 2/1983 | Loucks et al. |
| 4,399,241 A | 8/1983 | Ting et al. |
| 4,413,015 A | 11/1983 | Anderson et al. |
| 4,446,258 A | 5/1984 | Chu et al. |
| 4,468,483 A | 8/1984 | Yeakey et al. |
| 4,476,262 A | 10/1984 | Chu et al. |
| 4,487,861 A | 12/1984 | Winner |
| 4,510,513 A | 4/1985 | Yamaguchi et al. |
| 4,517,322 A | 5/1985 | Birkmeyer et al. |
| 4,522,984 A | 6/1985 | Watanabe et al. |
| 4,552,814 A | 11/1985 | Cavitt et al. |
| 4,564,655 A | 1/1986 | Liu |
| 4,600,737 A | 7/1986 | Georgalas et al. |
| 4,622,368 A | 11/1986 | Verbicky, Jr. et al. |
| 4,647,612 A | 3/1987 | Ranka et al. |
| 4,665,149 A | 5/1987 | Bertram et al. |
| 4,707,534 A | 11/1987 | Schultz |
| 4,729,983 A | 3/1988 | Satake et al. |
| 4,757,132 A | 7/1988 | Brunelle et al. |
| 4,794,102 A | 12/1988 | Petersen et al. |
| 4,794,156 A | 12/1988 | Ho et al. |
| 4,806,597 A | 2/1989 | Gallucci et al. |
| 4,849,502 A | 7/1989 | Evans et al. |
| 4,880,892 A | 11/1989 | Urano et al. |
| 4,963,602 A | 10/1990 | Patel |
| 4,994,217 A | 2/1991 | Banevicius et al. |
| 5,010,147 A | 4/1991 | Westeppe et al. |
| 5,068,284 A | 11/1991 | Ullman et al. |
| 5,080,961 A | 1/1992 | Macy et al. |
| 5,102,608 A | 4/1992 | Frencken et al. |
| 5,115,082 A | 5/1992 | Mercer et al. |
| 5,162,406 A | 11/1992 | Meyer et al. |
| 5,201,436 A | 4/1993 | Owens et al. |
| 5,212,241 A | 5/1993 | Woo et al. |
| 5,264,503 A | 11/1993 | Marx et al. |
| 5,288,839 A | 2/1994 | Greco |
| 5,296,525 A | 3/1994 | Spencer et al. |
| 5,446,009 A | 8/1995 | Minami et al. |
| 5,494,950 A | 2/1996 | Asakage et al. |
| 5,496,921 A | 3/1996 | Sakashita et al. |
| 5,527,840 A | 6/1996 | Chutko et al. |
| 5,567,781 A | 10/1996 | Martino et al. |
| 5,576,413 A | 11/1996 | Bussink et al. |
| 5,591,788 A | 1/1997 | Anderson et al. |
| 5,623,031 A | 4/1997 | Imura et al. |
| 5,677,398 A | 10/1997 | Motoshima et al. |
| 5,686,185 A | 11/1997 | Correll et al. |
| 5,718,352 A | 2/1998 | Diekhoff et al. |
| 5,718,353 A | 2/1998 | Kanfer et al. |
| 5,803,301 A | 9/1998 | Sato et al. |
| 5,807,912 A | 9/1998 | Wu et al. |
| 5,811,498 A | 9/1998 | Perumal et al. |
| 5,830,952 A | 11/1998 | Pedersen et al. |
| 5,859,172 A | 1/1999 | Sakashita et al. |
| 5,872,196 A | 2/1999 | Murata et al. |
| 5,880,248 A | 3/1999 | Sakashita et al. |
| 5,916,933 A | 6/1999 | Johnson et al. |
| 5,922,817 A | 7/1999 | Pedersen et al. |
| 5,925,694 A | 7/1999 | Stengel-Rutkowski et al. |
| 5,994,462 A | 11/1999 | Srinivasan et al. |
| 6,008,273 A | 12/1999 | Leibelt et al. |
| 6,034,157 A | 3/2000 | Craun et al. |
| 6,043,333 A | 3/2000 | Kuboki et al. |
| 6,048,931 A | 4/2000 | Fujita et al. |
| 6,060,577 A | 5/2000 | Davis |
| 6,133,402 A | 10/2000 | Coates et al. |
| 6,201,070 B1 | 3/2001 | Kumabe et al. |
| 6,225,436 B1 | 5/2001 | Eiffler et al. |
| 6,242,533 B1 | 6/2001 | Kurimoto et al. |
| 6,306,934 B1 | 10/2001 | Bode et al. |
| 6,376,021 B1 | 4/2002 | Spellane |
| 6,382,454 B1 | 5/2002 | Buffard et al. |
| 6,399,738 B1 | 6/2002 | Ito |
| 6,469,127 B1 | 10/2002 | Furunaga et al. |
| 6,472,472 B2 | 10/2002 | Jung et al. |
| 6,566,426 B1 | 5/2003 | Kanaida et al. |
| 6,576,718 B1 | 6/2003 | Yeager et al. |
| 6,579,829 B2 | 6/2003 | Nishimura et al. |
| 6,608,163 B2 | 8/2003 | Bailly et al. |
| 6,660,688 B2 | 12/2003 | Yamada et al. |
| 6,706,350 B2 | 3/2004 | Sato et al. |
| 6,777,464 B1 | 8/2004 | Watanabe et al. |
| 6,784,228 B2 | 8/2004 | Ogura et al. |
| 6,794,445 B2 | 9/2004 | Reusmann et al. |
| 6,808,752 B2 | 10/2004 | Mallen |
| 6,833,398 B2 | 12/2004 | Agarwal et al. |
| 6,844,071 B1 | 1/2005 | Wang et al. |
| 6,894,093 B2 | 5/2005 | Bittner |
| 6,916,874 B2 | 7/2005 | Mazza et al. |
| 6,924,328 B2 | 8/2005 | Legleiter et al. |
| 6,984,262 B2 | 1/2006 | King et al. |
| 6,984,608 B2 | 1/2006 | Makitalo et al. |
| 7,022,765 B2 | 4/2006 | Adedeji et al. |
| 7,037,584 B2 | 5/2006 | Wind et al. |
| 7,063,914 B2 | 6/2006 | Kawano et al. |
| 7,078,077 B2 | 7/2006 | Lynch et al. |
| 7,150,902 B2 | 12/2006 | Farha |
| 7,157,119 B2 | 1/2007 | Tang et al. |
| 7,189,787 B2 | 3/2007 | O'Brien et al. |
| 7,198,849 B2 | 4/2007 | Stapperfenne et al. |
| 7,208,538 B2 | 4/2007 | Taylor et al. |
| 7,256,228 B2 | 8/2007 | Agarwal et al. |
| 7,262,261 B2 | 8/2007 | Brindpke et al. |
| 7,332,557 B2 | 2/2008 | Shinohara et al. |
| 7,332,560 B2 | 2/2008 | Heuer et al. |
| 7,397,139 B2 | 7/2008 | Ikezawa et al. |
| 7,446,234 B2 | 11/2008 | More et al. |
| 7,544,727 B2 | 6/2009 | Ikezawa et al. |
| 7,585,904 B2 | 9/2009 | Nakamura |
| 7,592,047 B2 | 9/2009 | O'Brien et al. |
| 7,619,056 B2 | 11/2009 | East et al. |
| 7,635,662 B2 | 12/2009 | Kabashima et al. |
| 7,666,953 B2 | 2/2010 | Nakamura et al. |
| 7,675,185 B2 | 3/2010 | Tendou et al. |
| 7,682,674 B2 | 3/2010 | Vogt et al. |
| 7,709,582 B2 | 5/2010 | Kouchi et al. |
| 7,803,439 B2 | 9/2010 | Crawford et al. |
| 7,803,440 B2 | 9/2010 | Crawford et al. |
| 7,820,772 B2 | 10/2010 | Usui et al. |
| 7,838,577 B2 | 11/2010 | Hayakawa et al. |
| 7,846,998 B2 | 12/2010 | Akagi et al. |
| 7,910,170 B2 | 3/2011 | Evans et al. |
| 7,915,743 B2 | 3/2011 | Ishizawa et al. |
| 7,981,511 B2 | 7/2011 | Maenaka et al. |
| 7,981,515 B2 | 7/2011 | Ambrose et al. |
| 7,985,522 B2 | 7/2011 | Tajima et al. |
| 8,013,052 B2 | 9/2011 | Nakamura et al. |
| 8,110,614 B2 | 2/2012 | Ito et al. |
| 8,129,495 B2 | 3/2012 | Evans et al. |
| 8,142,858 B2 | 3/2012 | Mayr et al. |
| 8,168,276 B2 | 5/2012 | Cleaver et al. |
| 8,178,598 B2 | 5/2012 | Hakuya |
| 8,449,960 B2 | 5/2013 | Skillman et al. |
| 8,465,846 B2 | 6/2013 | O'Brien et al. |
| 8,492,467 B2 | 7/2013 | Yamaguchi |
| 8,519,085 B2 | 8/2013 | Evans et al. |
| 8,927,075 B2 | 1/2015 | Gibanel et al. |

(56) References Cited

U.S. PATENT DOCUMENTS

| | | |
|---|---|---|
| 9,409,219 B2 | 8/2016 | Niederst et al. |
| 9,475,328 B2 | 10/2016 | Niederst et al. |
| 9,540,484 B2 | 1/2017 | Craun et al. |
| 9,605,177 B2 | 3/2017 | Tang et al. |
| 9,724,276 B2 | 8/2017 | Niederst et al. |
| 9,944,749 B2 | 4/2018 | Niederst et al. |
| 10,113,027 B2 | 10/2018 | Niederst et al. |
| 2003/0170396 A1 | 9/2003 | Yokoi et al. |
| 2003/0171527 A1 | 9/2003 | Burgoyne et al. |
| 2003/0181628 A1 | 9/2003 | Horn et al. |
| 2003/0203991 A1 | 10/2003 | Schottman et al. |
| 2003/0209553 A1 | 11/2003 | Horn et al. |
| 2003/0232145 A1 | 12/2003 | Inomata et al. |
| 2004/0044101 A1 | 3/2004 | Hirose et al. |
| 2004/0092674 A1 | 5/2004 | Brindopke et al. |
| 2004/0110908 A1 | 6/2004 | Idemura et al. |
| 2004/0171746 A1 | 9/2004 | Parekh et al. |
| 2004/0176563 A1 | 9/2004 | Shinohara et al. |
| 2004/0214916 A1 | 10/2004 | Patel et al. |
| 2004/0214926 A1 | 10/2004 | Bittner |
| 2004/0220372 A1 | 11/2004 | Qi et al. |
| 2005/0014004 A1 | 1/2005 | King et al. |
| 2005/0075465 A1 | 4/2005 | Bolle et al. |
| 2005/0090044 A1 | 4/2005 | Kayaba et al. |
| 2005/0090593 A1 | 4/2005 | Heuer et al. |
| 2005/0196629 A1 | 9/2005 | Bariatinsky et al. |
| 2005/0215670 A1 | 9/2005 | Shimasaki et al. |
| 2006/0025559 A1 | 2/2006 | Wehrmann et al. |
| 2006/0052523 A1 | 3/2006 | Bushendorf et al. |
| 2006/0134541 A1 | 6/2006 | Fujii et al. |
| 2006/0142442 A1 | 6/2006 | Scherzer et al. |
| 2007/0036903 A1 | 2/2007 | Mayr et al. |
| 2007/0065589 A1 | 3/2007 | Florian |
| 2007/0065608 A1 | 3/2007 | Niederst |
| 2007/0087146 A1 | 4/2007 | Evans et al. |
| 2007/0099130 A1 | 5/2007 | Takahashi et al. |
| 2007/0141356 A1 | 6/2007 | Fugier et al. |
| 2007/0154643 A1 | 7/2007 | Schmid et al. |
| 2007/0281179 A1 | 12/2007 | Ambrose et al. |
| 2008/0033080 A1 | 2/2008 | Mader et al. |
| 2008/0171195 A1 | 7/2008 | Gothlich et al. |
| 2008/0193689 A1 | 8/2008 | Masselin et al. |
| 2008/0246173 A1 | 10/2008 | Braidwood et al. |
| 2008/0251757 A1 | 10/2008 | Yamamoto et al. |
| 2008/0319102 A1 | 12/2008 | Eckert et al. |
| 2008/0319156 A1 | 12/2008 | Fischer et al. |
| 2009/0068473 A1 | 3/2009 | Van et al. |
| 2009/0088535 A1 | 4/2009 | Arita et al. |
| 2009/0092827 A1 | 4/2009 | Robinson |
| 2009/0158963 A1 | 6/2009 | O'Dell et al. |
| 2009/0247032 A1 | 10/2009 | Mori et al. |
| 2009/0281224 A1 | 11/2009 | Koh et al. |
| 2009/0326107 A1 | 12/2009 | Bittner |
| 2010/0056663 A1 | 3/2010 | Ito et al. |
| 2010/0056721 A1 | 3/2010 | Wright et al. |
| 2010/0056726 A1 | 3/2010 | Payot et al. |
| 2010/0068433 A1 | 3/2010 | Gibanel et al. |
| 2010/0086716 A1 | 4/2010 | Ruediger et al. |
| 2010/0143681 A1 | 6/2010 | Yano et al. |
| 2010/0285309 A1 | 11/2010 | Barriau et al. |
| 2011/0042338 A1 | 2/2011 | Pecorini et al. |
| 2011/0160408 A1 | 6/2011 | De et al. |
| 2011/0294921 A1 | 12/2011 | Smith |
| 2011/0315591 A1 | 12/2011 | Lespinasse et al. |
| 2012/0125800 A1 | 5/2012 | Doreau et al. |
| 2012/0165429 A1 | 6/2012 | Boutevin et al. |
| 2012/0172568 A1 | 7/2012 | Ueda |
| 2012/0282475 A1 | 11/2012 | Fuhry et al. |
| 2012/0301645 A1 | 11/2012 | Moussa et al. |
| 2012/0301646 A1 | 11/2012 | List et al. |
| 2012/0301647 A1 | 11/2012 | Moussa et al. |
| 2012/0302690 A1 | 11/2012 | Cunningham et al. |
| 2013/0052381 A1 | 2/2013 | Gallucci et al. |
| 2013/0196037 A1* | 8/2013 | O'Brien ................ B65D 17/00 426/131 |
| 2013/0206756 A1 | 8/2013 | Niederst et al. |
| 2013/0280455 A1 | 10/2013 | Evans et al. |
| 2013/0316109 A1 | 11/2013 | Niederst et al. |
| 2013/0324652 A1 | 12/2013 | Pompignano et al. |
| 2014/0113093 A1 | 4/2014 | Corbin et al. |
| 2014/0322465 A1 | 10/2014 | Kaleem et al. |
| 2015/0021323 A1 | 1/2015 | Niederst et al. |
| 2015/0151878 A1 | 6/2015 | Niederst et al. |
| 2015/0197657 A1 | 7/2015 | Niederst et al. |
| 2015/0203713 A1 | 7/2015 | Niederst et al. |
| 2016/0107818 A1 | 4/2016 | Kaleem et al. |
| 2016/0122581 A1* | 5/2016 | You .................. C08F 283/10 428/35.8 |
| 2016/0272576 A1* | 9/2016 | Gibanel ................ C07C 233/18 |
| 2017/0029657 A1 | 2/2017 | Niederst et al. |
| 2017/0051177 A1 | 2/2017 | Prouvost et al. |
| 2017/0088745 A1 | 3/2017 | Matthieu et al. |
| 2017/0096521 A1 | 4/2017 | Niederst et al. |
| 2018/0112101 A1 | 4/2018 | Evans et al. |
| 2018/0112102 A1 | 4/2018 | Evans et al. |

FOREIGN PATENT DOCUMENTS

| | | |
|---|---|---|
| CA | 2280409 C | 5/2008 |
| CN | 1363619 A | 7/2002 |
| CN | 101096411 A | 1/2008 |
| CN | 101244290 A | 8/2008 |
| CN | 101370884 A | 2/2009 |
| CN | 104479105 A | 4/2015 |
| EP | 0265791 A2 | 5/1988 |
| EP | 0475359 A2 | 3/1992 |
| EP | 0185118 B1 | 9/1995 |
| EP | 1333075 A1 | 8/2003 |
| EP | 1818350 A1 | 8/2007 |
| JP | S63304068 A | 12/1988 |
| JP | H0255727 A | 2/1990 |
| JP | H07126574 A | 5/1995 |
| JP | H07138502 A | 5/1995 |
| JP | H07196770 A | 8/1995 |
| JP | H08151428 A | 6/1996 |
| JP | H08230328 A | 9/1996 |
| JP | 2000005019 A | 1/2000 |
| JP | 2002097250 A | 4/2002 |
| JP | 2002097409 A | 4/2002 |
| JP | 2002138245 A | 5/2002 |
| JP | 2002155727 A | 5/2002 |
| JP | 2002220563 A | 8/2002 |
| JP | 2003012763 A | 1/2003 |
| JP | 2003176348 A | 6/2003 |
| JP | 2003178348 A | 6/2003 |
| JP | 2003183352 A | 7/2003 |
| JP | 3484546 B2 | 1/2004 |
| JP | 2004010874 A | 1/2004 |
| JP | 2004053016 A | 2/2004 |
| JP | 2005320446 A | 11/2005 |
| JP | 2006176658 A | 7/2006 |
| KR | 100804293 B1 | 2/2008 |
| WO | WO-9526997 A1 | 10/1995 |
| WO | WO-9728905 A1 | 8/1997 |
| WO | WO-0071337 A1 | 11/2000 |
| WO | WO-0105901 A1 | 1/2001 |
| WO | WO-2004050740 A1 | 6/2004 |
| WO | WO-2007048094 A2 | 4/2007 |
| WO | WO-2007054304 A1 | 5/2007 |
| WO | WO-2008137562 A1 | 11/2008 |
| WO | WO-2009015493 A1 | 2/2009 |
| WO | WO-2009036790 A1 | 3/2009 |
| WO | WO-2009089145 A1 | 7/2009 |
| WO | WO-2010118349 A1 | 10/2010 |
| WO | WO-2010118356 A1 | 10/2010 |
| WO | WO-2010134608 A1 | 11/2010 |
| WO | WO-2011130671 A2 | 10/2011 |
| WO | WO-2012091701 A1 | 7/2012 |
| WO | WO-2012109278 A2 | 8/2012 |
| WO | WO-2012149340 A1 | 11/2012 |
| WO | WO-2012151184 A1 | 11/2012 |
| WO | WO-2012161758 A2 | 11/2012 |
| WO | WO-2012162298 A1 | 11/2012 |
| WO | WO-2012162299 A1 | 11/2012 |

(56) References Cited

FOREIGN PATENT DOCUMENTS

| WO | WO-2013119686 A1 | 8/2013 |
|---|---|---|
| WO | WO-2013149234 A2 | 10/2013 |
| WO | WO-2013169459 A1 | 11/2013 |
| WO | WO-2014025997 A1 | 2/2014 |
| WO | WO-2014140233 A1 | 9/2014 |
| WO | WO-2014140234 A1 | 9/2014 |
| WO | WO-2016201407 A1 | 12/2016 |

OTHER PUBLICATIONS

Application and File History for U.S. Appl. No. 15/803,657, filed Nov. 3, 2017, Inventors: Evans, et al, 221 pages.
CertiChem Inc., "Test Method Nomination: MCF-7 Cell Proliferation Assay of Estrogenic Activity," National Toxicology Program Interagency Center for the Evaluation of Alternative Toxicological Methods (NICEATM), Jun. 2007, 102 pages. Retrieved from https://ntp.niehs.nih.gov/iccvam/methods/endocrine/endodocs/submdoc.pdf.
Declaration of Dr. Larry B. Brandenburger under 37 C.P.R. §1.132 for Control No. 95/001,950 Concerning Inter Partes Reexamination of U.S. Pat. No. 8,092,876, 12 pages, Aug. 15, 2012.
Dow Chemical Company., "D.E.R.™ 661, Solid Epoxy Resin," Product Information, Form No. 296-01462-1007X-TD, 3 pages, May 8, 2018.
Dytek® A-Amine, Downloaded from the Oct. 16, 2014, Internet Archives capture at [https://web.archive.org/web/20141016043145/http://dytek.invista.com/Products/Amines/dytek-a-amine].
Eastman, "Eastman Tritan™ Copolyester—Lack of Estrogen and Testosterone Activity," TRS-270, Apr. 2010, 3 pages.
European Search Report for Application No. 12744671.4, dated Dec. 17, 2015, 5 pages.
European Search Report for Application No. 12790169.2, dated Nov. 26, 2015, 5 pages.
European Search Report for Application No. 17182623.3, dated Oct. 11, 2017, 8 pages.
Extended European Search Report for Application No. 15779232.6, dated Feb. 23, 2018, 13 pages.
Extended European Search Report for Application No. EP13827304, dated Mar. 21, 2016, 11 pages.
Extended European Search Report for Application No. EP18197657.2, dated Mar. 18, 2019, 8 pages.
Fang H., et al., "Quantitative Comparisions of in Vitro Assays for Estrogenic Activities," Environmental Health Perspectives, Aug. 2000, vol. 108 (8), pp. 723-729.
Fang H., et al., "Structure-Activity Relationships for a Large Diverse Set of Natural, Synthetic, and Environmental Estrogens," Chemical Research in Toxicology, Mar. 2001, vol. 14 (3), pp. 280-294.
First Office Action dated Oct. 31, 2018 for Chinese Application No. 201610835512.9, 7 pages.
"Flame Retardant Bisphenol F", Product Information Sheets, Nippon Kasei Chemical, 2013, 2 pages.
Flick E.W., "Epoxy Resins, Curing Agents, Compounds, and Modifiers—An Industrial Guide," Second Edition, 1993, 10 pages. available at http://www.daryatamin.com/uploads/Books%20File/Epoxy%20Resins,%20Curing%20Agents,%20Compounds,%20and%20Modifiers%20An%20Industrial%20Guide.pdf.
Grace Darex® Packaging Technologies, A Global Partner for Your Global Business, Product Book, 2006, 4 pages.
Guilin, et al., "Environmentally friendly paint formulation design," Chemical Industry Press, ISBN: 978-7-5025-9943-0, 2007, pp. 207-209 (6 pages).
Hashimoto Y., et al., "Measurement of Estrogenic Activity of Chemicals for the Development of New Dental Polymers," Toxicology in Vitro, 2001, vol. 15 (4-5), pp. 421-425.
International Preliminary Report on Patentability for Application No. PCT/US2011/032738, dated Oct. 26, 2012, 5 pages.
International Preliminary Report on Patentability for Application No. PCT/US2012/024191, dated Aug. 22, 2013, 7 pages.
International Preliminary Report on Patentability for Application No. PCT/US2012/024193, dated Aug. 22, 2013, 7 pages.
International Preliminary Report on Patentability for Application No. PCT/US20113/024960, dated Aug. 21, 2014, 9 pages.
International Preliminary Report on Patentability for Application No. PCT/US2016/060332, dated May 17, 2018, 8 pages.
International Search Report and Written Opinion for Application No. PCT/US2011/032738 dated Jan. 18, 2012, 13 pages.
International Search Report and Written Opinion for Application No. PCT/US2012/024191, dated Dec. 28, 2012, 13 pages.
International Search Report and Written Opinion for Application No. PCT/US2012/024193 dated Oct. 31, 2012, 9 pages.
International Search Report and Written Opinion for Application No. PCT/US2013/024960, dated May 31, 2013, 11 pages.
International Search Report and Written Opinion for Application No. PCT/US2013/054132, dated Oct. 23, 2013, 10 pages.
International Search Report and Written Opinion for Application No. PCT/US2015/025723, dated Jun. 29, 2015, 16 pages.
International Search Report and Written Opinion for Application No. PCT/US2016/060332, dated Feb. 12, 2017, 10 pages.
Junggang G., "Kinetics of Epoxy Resins Formation from Bisphenol-A, Bisphenol-S, and Epichlorohydrin," Journal of Applied Polymer Science, vol. 48, 1993, pp. 237-241.
Kitamura S., et al., "Comparative Study of the Endocrine-Disrupting Activity of Bisphenoi A and 19 Related Compounds," Toxicological Sciences, Jan. 5, 2005, vol. 84 (2), pp. 249-259.
Kobayashi S., et al., "Stereo Structure-Controlled and Electronic Structure-Controlled Estrogen-Like Chemicals to Design and Develop Non-estrogenic Bisphenol A Analogs Based on Chemical Hardness Concept," Chemical & Pharmaceutical Bulletin, Dec. 2006, vol. 54 (12), pp. 1633-1638.
Liu Z., et al., "Preparation, Characterization and Thermal Properties of Tetramethylbisphenol F Exposy Resin and Mixed Systems," Polymer International, Apr. 2012, vol. 61 (4), pp. 565-570.
Matasa C.G., et al., "A Wish List for Orthodontic Materials, 2005," The Orthodontic Materials Insider, Dec. 2004, vol. 16 (4), 8 pages.
Matsumoto S., et al., "The Crystal Structure of Two New Developers for High-Performance Thermo-Sensitive Paper: H-Bonded Network in Urea-Urethane Derivatives," Dyes and Pigments, May 2010, vol. 85 (3), pp. 139-142.
Mendum T., et al., "Concentration of Bisphenol A in Thermal Paper," Green Chemistry Letters and Reviews, Research Letter, Mar. 2011, vol. 4 (1), pp. 81-86.
Mesnage, et al., "Transcriptome Profiling Reveals Bisphenol A Alternatives Activate Estrogen Receptor in Human Breast Cancer Cells," Toxicology Sciences, 2017, vol. 158 (2), pp. 431-443.
Meti, "Current Status of Testing Methods Development For Endocrine Disrupters," 6th Meeting of the Task Force on Endocrine Disrupters Testing and Assessment (EDTA), Tokyo, Ministry of Economy, Trade and Industry, Japan, Jun. 24-25, 2002, 70 pages.
Momentive Specialty Chemicals Inc.., "EPON™ and EPI-REZ™ Epoxy Resins," Product Selector, Aug. 2013, 16 pages.
Moss G.P., "Extension and Revision of the Von Baeyer System for Naming Polycyclic Compounds (Including Bicyclic Compounds)," Pure and Applied Chemistry, 1999, vol. 71 (3), pp. 513-529.
Olsen C.M., et al., "Effects of the Environmental Oestrogens Bisphenol A, Tetrachlorobisphenol A, Tetrabromobisphenol A, 4-Hydroxybiphenyl and 4,4'-Dihydroxybiphenyl on Oestrogen Receptor Binding, Cell Proliferation and Regulation of Oestrogen Sensitive Proteins in the Human Breast Cancer Cell Line MCF-7," Pharmacology and Toxicology, Apr. 2003, vol. 92 (4), pp. 180-188.
Parent Application, U.S. Appl. No. 13/651,796, Evans et al., filed Oct. 15, 2012.
Polycarbonates, 4th-5th Edition, Kirk-Othmer Encyclopedia of Chemical Technology, 2000, pp. 1-30.
Poly(p-phenylene oxide), Wikipedia: The Free Encyclpedia, accessed Apr. 6, 2015, http://en.wikipedia.org/wiki/Poly(p-phenylene_oxide, 3 pages.
Porter D.S., et al., "Hot-Fill Containers," New Tech for OPP & PET, Plastics Technology, Eastman Chemical Co., Dec. 2007, 6 pages.
Ravdin, et al., "Estrogenic Effects of Phenolphthalein on Human Breast Cancer Cells In Vitro," Breast Cancer Research and Treatment, Jun. 1987, vol. 9 (2), pp. 151-154.

(56) References Cited

OTHER PUBLICATIONS

Rosenmai, et al., "Are Structural Analogues to Bisphenol a Safe Alternatives?," Toxicological Sciences, vol. 139 (1), 2014, pp. 35-47.
Song K.H., et al., "Endocrine Disrupter Bisphenol A induces Orphan Nuclear Gene Receptor Nur77 Gene Expression and Steroidogenesis in Mouse Testicular Leydig Cells," Endocrinology, Jun. 2002, vol. 143 (6), pp. 2208-2215.
Soto A.M., "Evidence of Absence: Estrogenicity Assessment of a New Food-Contact Coating and the Bisphenol Used in its Synthesis," Environmental Science and Technology, 2017, vol. 51 (8), pp. 1718-1726.
Extended European Search Report for Application No. 18166398.0, dated Oct. 26, 2018, 6 pages.
Olin North America Epoxy Resins (2016) brochure available at: https://www.brenntag.com/media/documents/bsi/product_data_sheets/material_science/olin_epoxy_resins/olin_epoxy_resins_brochure.pdf, 12 pages.
Extended European Search Report for Application No. 18150643.7, dated Oct. 26, 2018, 6 pages.
International Preliminary Report on Patentability for Application No. PCT/US2013/054132, dated Feb. 19, 2015, 8 pages.
International Prelinlinary Report on Patentability for Application No. PCT/US2015/025723, dated Oct. 27, 2016, 11 pages.
Supplementary European Search Report for Application No. 11769696.3, dated Jun. 27, 2014, 7 pages.
Supplementary European Search Report for Application No. 13746877.3, dated Nov. 30, 2015, 8 pages.
Supplementary Partial European Search Report for Application No. 15779232.6, dated Oct. 17, 2017, 14 pages.
Tice R.R., "The Single Ceil Gel/Comet Assay: A Microgel Electrophoretic Technique for the Detection of DNA Damage and Repair in Individual Cells," Environmental Mutagenesis, 1995, pp. 315-339.
U.S. Food and Drug Administration, "Bisphenol A (BPA): Use in Food Contact Application," 9 pages, [retrieved on Dec. 28, 2017]. Retrieved from the Internet [URL: www.fda.gov/newsevents/publichealthfocus/ucm064437.htm].
Vinas P., et al., "Comparison of Two Derivatization-Based Methods for Solid-Phase Microextraction-Gas Chromatography-Mass Spectrometric Determination of Bisphenol A, Bisphenol S and Biphenol Migrated from Food Cans," Analytical and Bioanalytical Chemistry, Feb. 2010, vol. 397 (1), pp. 115-125.
Vogel S., "A Non-Estrogenic Alternative to Bisphenol A at Last?," Environmental Defense Fund, (A blog post dated Jan. 23, 2017), 6 pages.
Woo B.G., et al, "Melt Polycondensation of Bisphenol A Polycarbonate by a Forced Gas Sweeping Process," Industrial & Engineering Chemistry Research, Feb. 2001, vol. 40 (5), pp. 1312-1319.
U.S. Appl. No. 13/651,796, filed Oct. 15, 2012, published as U.S. 2013/0280455 on Oct. 24, 2013.
U.S. Appl. No. 15/803,127, filed Nov. 3, 2017, published as U.S. 20180112101 on Apr. 26, 2018.
U.S. Appl. No. 15/803,657, filed Nov. 3, 2017, published as U.S. 20180112102 on Apr. 26, 2018.
U.S. Appl. No. 13/570,632, filed Aug. 9, 2012, now U.S. Pat. No. 9,409,219.
U.S. Appl. No. 13/570,743, filed Aug. 9, 2012, published as U.S. 20130316109 on Nov. 28, 2013.
U.S. Appl. No. 15/204,559, filed Jul. 7, 2016.
U.S. Appl. No. 16/384,263, filed Apr. 22, 2019.
U.S. Appl. No. 14/453,203, filed, published as U.S. 20150021323 on Jan. 22, 2015.
U.S. Appl. No. 14/616,175, filed Feb. 6, 2015, published as U.S. 20150151878 on Jun. 4, 2015.
U.S. Appl. No. 15/290,765, filed Oct. 11, 2016, published as U.S. 20170096521 on Apr. 6, 2017, now U.S. Pat. No. 10,113,027.
U.S. Appl. No. 16/161,677, filed Oct. 16, 2018, published as U.S. 20190048126 on Feb. 14, 2019.
U.S. Appl. No. 15/773,093, filed May 2, 2018, published as U.S. 20190031816 on Jan. 31, 2019.

\* cited by examiner

COMPOSITIONS FOR CONTAINERS AND OTHER ARTICLES AND METHODS OF USING SAME

CROSS-REFERENCE TO RELATED APPLICATIONS

This application is a continuation of U.S. application Ser. No. 14/616,175 filed on Feb. 6, 2015 and entitled "Compositions for Containers and Other Articles and Methods of Using Same", which is a continuation of International Application No. PCT/US2013/054132 filed on Aug. 8, 2013 and entitled "Compositions for Containers and Other Articles and Methods of Using Same", which claims priority to U.S. Provisional Application No. 61/681,434 filed on Aug. 9, 2012 and entitled "Compositions for Containers and Other Articles and Methods of Using Same," the disclosures of each of which are incorporated herein by reference in their entirety.

BACKGROUND

The application of coatings to metals to retard or inhibit corrosion is well established. This is particularly true in the area of packaging containers such as metal food and beverage cans. Coatings are typically applied to the interior of such containers to prevent the contents from contacting the metal of the container. Contact between the metal and the packaged product can lead to corrosion of the metal container, which can contaminate the packaged product. This is particularly true when the contents of the container are chemically aggressive in nature. Protective coatings are also applied to the interior of food and beverage containers to prevent corrosion in the headspace of the container between the fill line of the food product and the container lid.

Packaging coatings should preferably be capable of high-speed application to the substrate and provide the necessary properties when hardened to perform in this demanding end use. For example, the coating should be safe for food contact, not adversely affect the taste of the packaged food or beverage product, have excellent adhesion to the substrate, resist staining and other coating defects such as "popping," "blushing" and/or "blistering," and resist degradation over long periods of time, even when exposed to harsh environments. In addition, the coating should generally be capable of maintaining suitable film integrity during container fabrication and be capable of withstanding the processing conditions that the container may be subjected to during product packaging.

Various coatings have been used as interior protective can coatings, including polyvinyl-chloride-based coatings and epoxy-based coatings incorporating bisphenol A ("BPA"). Each of these coating types, however, has potential shortcomings. For example, the recycling of materials containing polyvinyl chloride or related halide-containing vinyl polymers can be problematic. There is also a desire by some to reduce or eliminate certain BPA-based compounds commonly used to formulate food-contact epoxy coatings.

What is needed in the marketplace is an improved binder system for use in coatings such as, for example, packaging coatings.

SUMMARY

This invention provides a polymer useful in a variety of applications, for example, as a binder polymer of a coating composition. In preferred embodiments, the polymer does not include any structural units derived from bisphenol A ("BPA"), bisphenol F ("BPF"), bisphenol S ("BPS"), or any diepoxides thereof (e.g., diglycidyl ethers thereof such as the diglycidyl ether of BPA ("BADGE")). In addition, the polymer preferably does not include any structural units derived from a dihydric phenol, or other polyhydric phenol, having estrogenic agonist activity greater than or equal to that of 4,4'-(propane-2,2-diyl)diphenol. More preferably, the polymer does not include any structural units derived from a dihydric phenol, or other polyhydric phenol, having estrogenic agonist activity greater than or equal to that of BPS. Even more preferably, the polymer does not include (e.g., is substantially free or completely free of) any structural units derived from a dihydric phenol, or other polyhydric phenol, having estrogenic agonist activity greater than 4,4'-(propane-2,2-diyl)bis(2,6-dibromophenol). Optimally, the polymer does not include any structural units derived from a dihydric phenol, or other polyhydric phenol, having estrogenic agonist activity greater than 2,2-bis(4-hydroxyphenyl)propanoic acid. The same is preferably true for any other components of a composition including the polymer.

In some embodiments, the polymer is a polyether polymer that contains a plurality of aromatic ether segments. The polyether polymer may be formed, for example, from reactants including an extender (e.g., a diol, more typically a polyhydric phenol, even more typically a dihydric phenol) and a diepoxide compound (e.g., a polyepoxide of a polyhydric phenol, more typically a diepoxide of a dihydric phenol). While not intending to be bound by any theory, one or more of the following structural characteristics may help avoid undesirable estrogenic agonist activity should any residual unreacted polyhydric phenol persist: the presence of "bulky" substituent groups, molecular weight (e.g., of the "bridge" region of a bisphenol), and the presence of polar groups.

Preferred polymers of the present invention are suitable for use in a variety of end uses, including as a film-forming material of a coating. In some such embodiments, the polymer has a glass transition temperature ("Tg") of at least 30° C., more preferably at least 60° C., and a number average molecular weight of at least 1,000 or at least 2,000. Aryl or heteroaryl groups preferably constitute at least 25 weight percent of the polymer.

In preferred embodiments, the polyether polymer is formed by reacting ingredients including: (i) an extender (e.g., a diol) and (ii) a diepoxide compound, wherein one or both of the extender or the diepoxide compound include one or more segments of the below Formula (I), and wherein the polyether polymer preferably includes a plurality of the below segments of Formula (I):

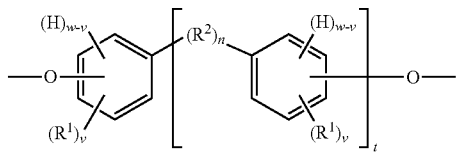

Formula (I)

wherein:
each of the pair of oxygen atoms depicted in Formula (I) is preferably present in an ether or ester linkage, more preferably an ether linkage;

"H" denotes a hydrogen atom;

each $R^1$, if present, is independently an atom or group that is preferably substantially non-reactive with an epoxy group;

v is independently 0 to 4 when t is 0 and v is independently 0 to 3, more preferably 0 to 2, when t is 1;

w is 4;

$R^2$, if present, is preferably a divalent group;

n is 0 or 1, with the proviso that if n is 0, the phenylene groups depicted in Formula (I) can optionally join to form a fused ring system with each other (e.g., a substituted naphthalene group), in which case w is 3 (as opposed to 4) and v is 0 to 2;

t is 0 or 1; and wherein two or more $R^1$ and/or $R^2$ groups can join to form one or more cyclic groups.

When t is 1, the segment of Formula (I) is a segment of the below Formula (IA).

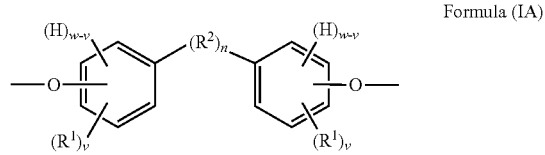

Formula (IA)

When t is 0, the segment of Formula (I) is a segment of the below Formula (IB).

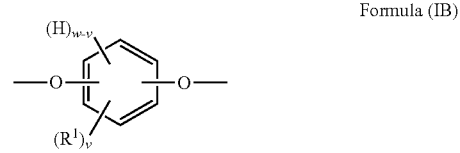

Formula (IB)

The segment of Formula (IA) preferably includes at least one Hydrogen atom attached to each phenylene ring at an ortho position relative to the depicted oxygen atoms. More preferably, the segment of Formula (IA) includes two Hydrogen atoms attached to each phenylene ring at ortho positions relative to the depicted oxygen atoms. In some embodiments, the segment of Formula (IA) includes Hydrogen atoms attached to each phenylene ring at all of the ortho and meta position relative to the depicted oxygen atoms.

In certain preferred embodiments, no more than one $R^1$ is attached to each phenylene ring depicted in Formula (IA) at an ortho position relative to the depicted oxygen atom. Non-limiting examples of $R^1$ groups include groups having at least one carbon atom, a halogen atom, a sulfur-containing group, or any other suitable group that is preferably substantially non-reactive with an epoxy group. If present, organic groups are presently preferred, with organic groups that are free of halogen atoms being particularly preferred.

In preferred embodiments, the polymer also includes pendant hydroxyl groups (e.g., secondary hydroxyl groups) and, more preferably, one or more —$CH_2$—CH(OH)—$CH_2$— or —$CH^2$—$CH_2$—CH(OH)— segments, which are preferably derived from an oxirane and located in a backbone of the polymer.

The present invention also provides a coating composition that includes the polymer described herein, more preferably a polyether polymer described herein. The coating composition preferably includes at least a film-forming amount of the polymer and may optionally include one or more additional polymers. The coating composition is useful in coating a variety of substrates, including as an interior or exterior coating on metal packaging containers or portions thereof. In preferred embodiments, the coating composition is useful as a food-contact coating on a food or beverage container. In preferred embodiments, the coating composition is at least substantially free of mobile BPA or BADGE, and more preferably is completely free of BPA or BADGE. More preferably, the coating composition is at least substantially free, and more preferably completely free, of mobile or bound polyhydric phenols having estrogenic agonist activity greater than or equal to that of 4,4'-(propane-2,2-diyl)diphenol. Even more preferably, the coating composition is at least substantially free, and more preferably completely free, of mobile or bound polyhydric phenols having estrogenic agonist activity greater than or equal to that of BPS. Even more preferably, the coating composition is at least substantially free, and more preferably completely free, of mobile or bound polyhydric phenols having estrogenic agonist activity greater than that of 4,4'-(propane-2,2-diyl)bis(2,6-dibromophenol). Optimally, the coating composition is at least substantially free, and more preferably completely free, of mobile or bound polyhydric phenols having estrogenic agonist activity greater than about that of 2,2-bis(4-hydroxyphenyl)propanoic acid). The coating composition may also have utility in a variety of other coating end uses, including, for example, coatings for valves and fittings, especially valves and fittings for use with potable water; pipes for conveying liquids, especially potable water pipes; and liquid storage tanks, especially potable water tanks, e.g., bolted steel water tanks.

In one embodiment, the coating composition of the present invention is a powder coating composition that preferably includes a base powder, formed at least in part, from the polymer of the present invention. The coating composition may include one or more optional ingredients in the particles of the base powder and/or in a separate particle. Such optional ingredients may include, for example, crosslinker, cure accelerator, colored pigment, filler, flow additives, etc.

The present invention also provides packaging articles having a coating composition of the present invention applied to a surface of the packaging article. In one embodiment, the packaging article is a container such as a food or beverage container, or a portion thereof (e.g., a twist-off closure lid, beverage can end, food can end, etc.), wherein at least a portion of an interior surface of the container is coated with a coating composition described herein that is suitable for prolonged contact with a food or beverage product or other packaged product.

In one embodiment, a method of preparing a container is provided that includes an interior, food-contact coating of the present invention. The method includes: providing a coating composition described herein that includes a binder polymer and optionally a liquid carrier; and applying the coating composition to at least a portion of a surface of a substrate prior to or after forming the substrate into a container or a portion thereof having the coating composition disposed on an interior surface. Typically, the substrate is a metal substrate, although the coating composition may be used to coat other substrate materials if desired. Examples of other substrate materials may include fiberboard, plastic (e.g., polyesters such as, e.g., polyethylene terephthalates; nylons; polyolefins such as, e.g., polypropylene, polyethylene, and the like; ethylene vinyl alcohol; polyvinylidene chloride; and copolymers thereof) and paper.

In one embodiment, a method of forming food or beverage cans, or a portion thereof, is provided that includes: applying a coating composition described herein to a metal substrate (e.g., applying the coating composition to the metal substrate in the form of a planar coil or sheet), hardening the coating composition, and forming the substrate into a food or beverage can or a portion thereof.

In certain embodiments, forming the substrate into an article includes forming the substrate into a can end or a can body. In certain embodiments, the article is a two-piece drawn food can, three-piece food can, food can end, drawn and ironed food or beverage can, beverage can end, easy open can end, twist-off closure lid, and the like. Suitable metal substrates include, for example, steel or aluminum.

In certain embodiments, a packaging container is provided having: (a) a coating composition of the present invention disposed on at least a portion of an interior or exterior surface of the container and (b) a product packaged therein such as a food, beverage, cosmetic, or medicinal product.

In one embodiment, a packaging container having a coating composition of the present invention disposed on an interior surface is provided that includes a packaged product intended for human contact or consumption, e.g., a food or beverage product, a cosmetic product, or a medicinal product.

The above summary of the present invention is not intended to describe each disclosed embodiment or every implementation of the present invention. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list. Unless otherwise indicated, the structural representations included herein are not intended to indicate any particular stereochemistry and are intended to encompass all stereoisomers.

DEFINITIONS

As used herein, the term "organic group" means a hydrocarbon group (with optional elements other than carbon and hydrogen, such as oxygen, nitrogen, sulfur, and silicon) that is classified as an aliphatic group, a cyclic group, or combination of aliphatic and cyclic groups (e.g., alkaryl and aralkyl groups).

The term "cyclic group" means a closed ring hydrocarbon group that is classified as an alicyclic group or an aromatic group, both of which can include heteroatoms.

The term "alicyclic group" means a cyclic hydrocarbon group having properties resembling those of aliphatic groups.

The term "aryl group" (e.g., an arylene group) refers to a closed aromatic ring or ring system such as phenylene, naphthylene, biphenylene, fluorenylene, and indenyl, as well as heteroarylene groups (e.g., a closed aromatic or aromatic-like ring hydrocarbon or ring system in which one or more of the atoms in the ring is an element other than carbon (e.g., nitrogen, oxygen, sulfur, etc.)). Suitable heteroaryl groups include furyl, thienyl, pyridyl, quinolinyl, isoquinolinyl, indolyl, isoindolyl, triazolyl, pyrrolyl, tetrazolyl, imidazolyl, pyrazolyl, oxazolyl, thiazolyl, benzofuranyl, benzothiophenyl, carbazolyl, benzoxazolyl, pyrimidinyl, benzimidazolyl, quinoxalinyl, benzothiazolyl, naphthyridinyl, isoxazolyl, isothiazolyl, purinyl, quinazolinyl, pyrazinyl, 1-oxidopyridyl, pyridazinyl, triazinyl, tetrazinyl, oxadiazolyl, thiadiazolyl, and so on. When such groups are divalent, they are typically referred to as "arylene" or "heteroarylene" groups (e.g., furylene, pyridylene, etc.)

A group that may be the same or different is referred to as being "independently" something. Substitution on the organic groups of the compounds of the present invention is contemplated. As a means of simplifying the discussion and recitation of certain terminology used throughout this application, the terms "group" and "moiety" are used to differentiate between chemical species that allow for substitution or that may be substituted and those that do not allow or may not be so substituted. Thus, when the term "group" is used to describe a chemical substituent, the described chemical material includes the unsubstituted group and that group with O, N, Si, or S atoms, for example, in the chain (as in an alkoxy group) as well as carbonyl groups or other conventional substitution. Where the term "moiety" is used to describe a chemical compound or substituent, only an unsubstituted chemical material is intended to be included. For example, the phrase "alkyl group" is intended to include not only pure open chain saturated hydrocarbon alkyl substituents, such as methyl, ethyl, propyl, t-butyl, and the like, but also alkyl substituents bearing further substituents known in the art, such as hydroxy, alkoxy, alkylsulfonyl, halogen atoms, cyano, nitro, amino, carboxyl, etc. Thus, "alkyl group" includes ether groups, haloalkyls, nitroalkyls, carboxyalkyls, hydroxyalkyls, sulfoalkyls, etc. On the other hand, the phrase "alkyl moiety" is limited to the inclusion of only pure open chain saturated hydrocarbon alkyl substituents, such as methyl, ethyl, propyl, t-butyl, and the like. As used herein, the term "group" is intended to be a recitation of both the particular moiety, as well as a recitation of the broader class of substituted and unsubstituted structures that includes the moiety.

The term "polyhydric phenol" as used herein refers broadly to any compound having one or more aryl or heteroaryl groups (more typically one or more phenylene groups) and at least two hydroxyl groups attached to a same or different aryl or heteroaryl ring. Thus, for example, both hydroquinone and 4,4'-biphenol are considered to be polyhydric phenols. As used herein, polyhydric phenols typically have six carbon atoms in an aryl ring, although it is contemplated that aryl or heteroaryl groups having rings of other sizes may be used.

The term "diphenol" as used herein refers to a polyhydric phenol compound that includes two aryl or heteroaryl groups (more typically two phenylene groups) that each have a hydroxyl group attached to the aryl or heteroaryl ring. Thus, for example, hydroquinone is not considered a diphenol.

The term "phenylene" as used herein refers to a six-carbon atom aryl ring (e.g., as in a benzene group) that can have any substituent groups (including, e.g., hydrogen atoms, halogens, hydrocarbon groups, oxygen atoms, hydroxyl groups, etc.). Thus, for example, the following aryl groups are each phenylene rings: —$C_6H_4$—, —$C_6H_3$($CH_3$)—, and —$C_6H(CH_3)_2Cl$—. In addition, for example, each of the aryl rings of a naphthalene group are phenylene rings.

The term "substantially free" of a particular mobile or bound compound means that the recited material or composition contains less than 1,000 parts per million (ppm) of the recited mobile or bound compound. The term "essentially free" of a particular mobile or bound compound means that the recited material or composition contains less than 100 parts per million (ppm) of the recited mobile or bound compound. The term "essentially completely free" of a particular mobile or bound compound means that the recited material or composition contains less than 5 parts per million (ppm) of the recited mobile or bound compound. The term "completely free" of a particular mobile or bound compound means that the recited material or composition contains less than 20 parts per billion (ppb) of the recited mobile or bound compound. If the aforementioned phrases are used without the term "mobile" or "bound" (e.g., "substantially free of BPA"), then the recited material or composition contains less than the aforementioned amount of the compound whether the compound is mobile or bound.

The term "mobile" means that the compound can be extracted from the cured coating when a coating (typically ~1 mg/cm$^2$) is exposed to a test medium for some defined set of conditions, depending on the end use. An example of these testing conditions is exposure of the cured coating to HPLC-grade acetonitrile for 24 hours at 25° C.

The term "bound" when used in combination with one of the aforementioned phrases in the context, e.g., of a bound compound of a polymer or other ingredient of a coating composition (e.g., a polymer that is substantially free of bound BPA) means that the polymer or other ingredient contains less than the aforementioned amount of structural units derived from the compound. For example, a polymer that is substantially free of bound BPA includes less than 1,000 ppm (or 0.1% by weight), if any, of structural units derived from BPA.

When the phrases "does not include any," "free of" (outside the context of the aforementioned phrases), and the like are used herein, such phrases are not intended to preclude the presence of trace amounts of the pertinent structure or compound which may be present due to environmental contaminants.

The terms "estrogenic activity" or "estrogenic agonist activity" refer to the ability of a compound to mimic hormone-like activity through interaction with an endogenous estrogen receptor, typically an endogenous human estrogen receptor.

The term "food-contact surface" refers to the substrate surface of a container (typically an inner surface of a food or beverage container) that is in contact with, or intended for contact with, a food or beverage product. By way of example, an interior surface of a metal substrate of a food or beverage container, or a portion thereof, is a food-contact surface even if the interior metal surface is coated with a polymeric coating composition.

The term "unsaturated" when used in the context of a compound refers to a compound that includes at least one non-aromatic double bond.

The term "crosslinker" refers to a molecule capable of forming a covalent linkage between polymers or between two different regions of the same polymer.

The term "on," when used in the context of a coating applied on a surface or substrate, includes both coatings applied directly or indirectly to the surface or substrate. Thus, for example, a coating applied to a primer layer overlying a substrate constitutes a coating applied on the substrate.

Unless otherwise indicated, the term "polymer" includes both homopolymers and copolymers (e.g., polymers of two or more different monomers). Similarly, unless otherwise indicated, the use of a term designating a polymer class such as, for example, "polyether" is intended to include both homopolymers and copolymers (e.g., polyether-ester copolymers).

The terms "comprises" and variations thereof do not have a limiting meaning where these terms appear in the description and claims.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, "a," "an," "the," "at least one," and "one or more" are used interchangeably. Thus, for example, a coating composition that comprises "a" polyether can be interpreted to mean that the coating composition includes "one or more" polyethers.

Also herein, the recitations of numerical ranges by endpoints include all numbers subsumed within that range (e.g., 1 to 5 includes 1, 1.5, 2, 2.75, 3, 3.80, 4, 5, etc.). Furthermore, disclosure of a range includes disclosure of all subranges included within the broader range (e.g., 1 to 5 discloses 1 to 4, 1.5 to 4.5, 4 to 5, etc.).

DETAILED DESCRIPTION OF ILLUSTRATIVE EMBODIMENTS

In one aspect, the present invention provides a coating composition that includes a polymer, more preferably a binder polymer, and even more preferably a polyether binder polymer. Although the ensuing discussion focuses primarily on coating end uses, it is contemplated that the polymer of the present invention, as well as intermediates thereof, may have utility in a variety of other end uses such as, for example, in adhesives or composites.

Coating compositions of the present invention preferably include at least a film-forming amount of the polymer described herein. In addition to the polymer, the coating composition may also include one or more additional ingredients such as, for example, a crosslinker, a liquid carrier, and any other suitable optional additives. Although any suitable cure mechanism may be used, thermoset coating compositions are preferred. Moreover, although coating compositions including a liquid carrier are presently preferred, it is contemplated that the polymer of the present invention may have utility in solid coating application techniques such as, for example, powder coating.

Coating compositions of the present invention may have utility in a variety of end uses, including packaging coating end uses. Other coating end uses may include industrial coatings, marine coatings (e.g., for ship hulls), storage tanks (e.g., metal or concrete), architectural coatings (e.g., on cladding, metal roofing, ceilings, garage doors, etc.), gardening tools and equipment, toys, automotive coatings, metal furniture coatings, coil coatings for household appliances, floor coatings, and the like.

Preferred coating compositions of the present invention exhibit a superior combination of coating attributes such as good flexibility, good substrate adhesion, good chemical resistance and corrosion protection, good fabrication properties, and a smooth and regular coating appearance free of blisters and other application-related defects.

In preferred embodiments, the coating composition is suitable for use as an adherent packaging coating and, more preferably, as an adherent coating on an interior and/or exterior surface of a food or beverage container. Thus, in preferred embodiments, the coating composition is suitable for use as a food-contact coating. It is also contemplated that the coating composition may have utility in cosmetic packaging or medical packaging coating end uses, and as a drug-contact coating in particular (e.g., as an interior coating of a metered dose inhaler can—commonly referred to as an "MDI" container). It is also contemplated that the coating composition may have utility in coating applications in which the coated substrate will contact bodily fluids such as, e.g., as an interior coating of a blood vial.

The ingredients used to make the polymer of the present invention are preferably free of any dihydric phenols, or corresponding diepoxides (e.g., diglycidyl ethers), that exhibit an estrogenic agonist activity in the MCF-7 assay (discussed later herein) greater than or equal to that that exhibited by 4,4'-(propane-2,2-diyl)diphenol in the assay. More preferably, the aforementioned ingredients are free of any dihydric phenols, or corresponding diepoxides, that exhibit an estrogenic agonist activity in the MCF-7 assay greater than or equal to that of bisphenol S. Even more preferably, the aforementioned ingredients are free of any dihydric phenols, or corresponding diepoxides, that exhibit an estrogenic agonist activity in the MCF-7 assay greater than that of 4,4'-(propane-2,2-diyl)bis(2,6-dibromophenol). Optimally, the aforementioned ingredients are free of any dihydric phenols, or corresponding diepoxides, that exhibit an estrogenic agonist activity in the MCF-7 assay greater than about that of 2,2-bis(4-hydroxyphenyl)propanoic acid. The same is preferably true for any other ingredients of a coating composition including the polymer.

While not intending to be bound by any theory, it is believed that a dihydric phenol is less likely to exhibit any appreciable estrogenic agonist activity if the compound's chemical structure is sufficiently different from compounds having estrogenic activity such as diethylstilbestrol. The structure of preferred dihydric phenol compounds, as will be discussed herein, are sufficiently different such that the compounds do not bind and activate a human receptor. These preferred compounds are, in some instances, at least about 6 or more orders of magnitude less active than diethylstilbestrol (e.g., when assessing estrogenic agonist effect using an in vitro assay such as the MCF-7 cell proliferation assay discussed later herein). Without being bound by theory, it is believed that such desirable structural dissimilarity can be introduced via one or more structural features, including any suitable combination thereof. For example, it is believed that one or more of the following structural characteristics can be used to achieve such structural dissimilarity:

segments of Formula IB;

molecular weight that is arranged in three-dimensional space such that: (i) the compound does not fit, or does not readily fit, in the active site of a human estrogen receptor or (ii) the structural configuration interferes with activation of the human estrogen receptor once inside the active site, and the presence of polar groups (e.g., in addition to the two hydroxyl groups of a bisphenol compound).

In one preferred embodiment, the polymer of the present invention is a polyether polymer formed by reacting: (i) an extender (e.g., a diol) with (ii) a diepoxide compound, wherein one or both of the extender or the diepoxide compound include one or more segments of the below Formula (I), and wherein the polymer preferably includes a plurality of the below segments of Formula (I):

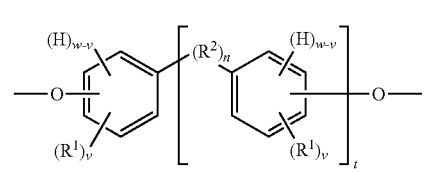
Formula (I)

wherein:
each of the pair of oxygen atoms depicted in Formula (I) is preferably present in an ether or ester linkage, more preferably an ether linkage;
"H" denotes a hydrogen atom, if present;
each $R^1$, if present, is preferably substantially non-reactive with an epoxy group;
v is independently 0 to 4 when t is 0 and v is independently 0 to 3, more preferably 0 to 2, when t is 1;
w is 4;
each of the phenylene groups depicted in Formula (I) includes at least one Hydrogen atom attached to the ring at an ortho position relative to the oxygen atom (more preferably 2 Hydrogen atoms at the ortho positions, even more preferably Hydrogen atoms at all ortho and meta positions);
$R^2$, if present, is preferably a divalent group;
n is 0 or 1, with the proviso that if n is 0, the phenylene groups depicted in Formula (I) can optionally join to form a fused ring system (e.g., a substituted naphthalene group) in which case w is 3 (as opposed to 4) and v is 0 to 2;
t is 0 or 1; and
two or more $R^1$ and/or $R^2$ groups can optionally join to form one or more cyclic groups.

When t is 1, the segment of Formula (I) is a segment of the below Formula (IA).

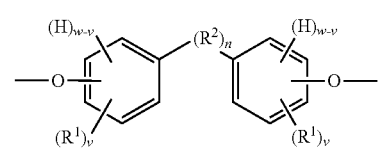
Formula (IA)

When t is 0, the segment of Formula (I) is a segment of the below Formula (IB).

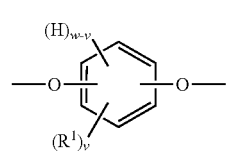
Formula (IB)

As depicted in the above Formula (I), the segment includes at least one phenylene group when t is 0 (illustrated in Formula (IB)) and includes at least two phenylene groups when t is 1 (illustrated in Formula (IA)). The segments of each of Formulas (IA) and (IB) may optionally include one or more additional phenylene or other aryl or heteroaryl groups in addition to those depicted. Although aryl groups having a six-carbon aromatic ring are presently preferred, it is contemplated that any other suitable aryl or heteroaryl groups may be used in place of the phenylene groups depicted in Formula (I). As depicted in the above Formula (I), the substituent groups (e.g., —O—, H, $R^1$, and $R^2$) of each phenylene group can be located at any position on the ring relative to one another, although in certain preferred embodiments at least one $R^1$ is positioned on the ring immediately adjacent to the oxygen atom. In other embodiments in which other aryl or heteroarylene group(s) are used in place of the depicted phenylene group(s) in Formula (I), it is contemplated that the same would hold true for the substituent groups of such other aryl or heteroarylene group(s).

In preferred embodiments, each $R^1$ and $R^2$, if present, are preferably not reactive with an oxirane group at a temperature of less than about 200° C.

In presently preferred embodiments, the $R^1$ groups of each phenylene group, if present, preferably includes at least one carbon atom, more preferably 1 to 10 carbon atoms, and even more preferably 1 to 4 carbon atoms. $R^1$ will typically be a saturated or unsaturated hydrocarbon group, more typically saturated, that may optionally include one or more heteroatoms other than carbon or hydrogen atoms (e.g., N, O, S, Si, a halogen atom, etc.). Examples of suitable hydrocarbon groups may include substituted or unsubstituted: alkyl groups (e.g., methyl, ethyl, propyl, butyl, etc., including isomers thereof), alkenyl groups, alkynyl groups, alicyclic groups, aryl groups, or combinations thereof.

In certain preferred embodiments, each phenylene group depicted in Formula (I) includes at least one alkyl $R^1$ group. As discussed above, any suitable isomer may be used. Thus, for example, a linear butyl group may be used or a branched isomer such as an isobutyl group or a tert-butyl group. In one embodiment, a tert-butyl group (and more preferably a tert-butyl moiety) is a preferred $R^1$ group.

As previously mentioned, it is contemplated that $R^1$ may include one or more cyclic groups. In addition, $R^1$ may form a cyclic or polycyclic group with one or more other $R^1$ groups and/or $R^2$.

$R^2$ is present or absent in the segment of Formula (IA) depending on whether n is 0 or 1. When $R^2$ is absent in the segment of Formula (IA), either (i) a carbon atom of one phenylene ring is covalently attached to a carbon atom of the other phenylene ring (which occurs when w is 4) or (ii) the phenylene groups depicted in Formula (IA) join to form a fused ring system (which occurs when w is 3 and the two phenylene groups are so fused). In some embodiments, $R^2$ (or the ring-ring covalent linkage if $R^2$ is absent) is preferably attached to at least one, and more preferably both, phenylene rings at a para position (i.e., 1,4 position) relative to the oxygen atom depicted in Formula (IA). An embodiment of the segment of Formula (IA), in which n is 0, w is 3, and v is independently 0 to 3 such that the two phenylene groups have joined to form a naphthalene group, is depicted below.

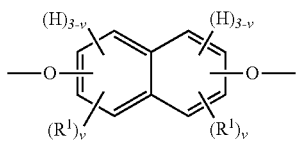

$R^2$ can be any suitable divalent group including, for example, carbon-containing groups (which may optionally include heteroatoms such as, e.g., N, O, P, S, Si, a halogen atom, etc.), sulfur-containing groups (including, e.g., a sulfur atom, a sulfinyl group (—S(O)—), a sulfonyl group (—S($O_2$)—), etc.), oxygen-containing groups (including, e.g., an oxygen atom, a ketone group, etc.), nitrogen-containing groups, or a combination thereof.

In preferred embodiments of the segment of Formula (IA), $R^2$ is present and is typically an organic group containing less than about 15 carbon atoms, and even more typically an organic group containing 1 or 4-15 carbon atoms. In some embodiments, $R^2$ includes 8 or more carbon atoms. $R^2$ will typically be a saturated or unsaturated hydrocarbon group, more typically a saturated divalent alkyl group, and most preferably an alkyl group that doesn't constrain the movement of the connected phenylene groups in an orientation similar to that of diethylstilbestrol or dienestrol. In some embodiments, $R^2$ may include one or more cyclic groups, which may be aromatic or alicyclic and can optionally include heteroatoms. The one or more optional cyclic groups of $R^2$ can be present, for example, (i) in a chain connecting the two phenylene groups depicted in Formula (IA), (ii) in a pendant group attached to a chain connecting the two phenylene groups, or both (i) and (ii).

The atomic weight of the $R^2$ group, if present, may be any suitable atomic weight. Typically, however, $R^2$ has an atomic weight of less than about 500 Daltons, less than about 400 Daltons, less than 300 Daltons, or less than 250 Daltons.

In some embodiments, $R^2$ includes a carbon atom that is attached to a carbon atom of each of the phenylene groups depicted in Formula (I). For example, $R^2$ can have a structure of the formula —$C(R^7)(R^8)$—, wherein $R^7$ and $R^8$ are each independently a hydrogen atom, a halogen atom, an organic group, a sulfur-containing group, a nitrogen-containing group, or any other suitable group that is preferably substantially non-reactive with an epoxy group, and wherein $R^7$ and $R^8$ can optionally join to form a cyclic group. In some embodiments, at least one of $R^7$ and $R^8$ is a hydrogen atom, and more preferably both. In one preferred embodiment, $R^2$ is a divalent methylene group (—$CH_2$—). While not intending to be bound by theory, it is believed that it may be generally desirable to avoid using an $R^2$ group wherein each of $R^7$ and $R^8$ are methyl (—$CH_3$) groups. It may also be generally desirable to avoid using an $R^2$ group in which $R^7$ and $R^8$ join to form a monocyclic cyclohexyl group.

It is also thought to be generally desirable to avoid using either of the following "constrained" unsaturated structures (i) or (ii) as $R^2$: (i) —$C(R^9)$=$C(R^9)$— or (ii) —$C(=C(R^{10})_y)$—$C(=C(R^{10})_y)$—, wherein y is 1 or 2 and each of $R^9$ or $R^{10}$ is independently a hydrogen atom, a halogen atom, an organic group, or a monovalent group. For example, the following unsaturated structures (i) and (ii) are preferably avoided as $R^2$: (i) —$C(CH_2CH_3)$=$C(CH_2CH_3)$— and (ii) —$C(=CHCH_3)$—$C(=CHCH_3)$—.

While not intending to be bound by theory it is believed that a suitably low atomic weight $R^2$ group such as, e.g., —$CH_2$— (14 Daltons), can help avoid estrogenic activity. In some embodiments where $R^2$ is a —$C(R^7)(R^8)$— group, it may be desirable that $R^2$ have an atomic weight of less than 42 Daltons or less than 28 Daltons. It is also believed that a suitably high atomic weight $R^2$ can also help interfere with the ability of a dihydric phenol to function as an agonist for a human estrogen receptor. In some embodiments where $R^2$ is a —$C(R^7)(R^8)$— group, it may be desirable that $R^2$ have an atomic weight that is greater than about: 125, 150, 175, or 200 Daltons. By way of example, a diphenol compound has been determined to be appreciably non-estrogenic that: (a) is not "hindered" (e.g., the phenol hydroxyl groups are surrounded by ortho hydrogens) and (b) has an $R^2$ group in the form of —$C(R^7)(R^8)$— having an atomic weight greater than 200 Daltons.

While not intending to be bound to theory, preferred $R^2$'s include divalent groups that promote that the orientation of a dihydric phenol compound in a three-dimensional configuration that is sufficiently different from 17β-estradiol or other compounds (e.g., diethylstilbestrol) having estrogenic activity. For example, while not intending to be bound to theory, it is believed that the presence of $R^2$ as an unsubstituted methylene bridge (—$CH_2$—) can contribute to the reduction or elimination of estrogenic activity. It is also contemplated that a singly substituted methylene bridge having one hydrogen attached to the central carbon atom of the methylene bridge (—$C(R^7)(H)$—; see, e.g. the $R^2$ group of 4,4'Butylidenebis(2-t-butyl-5-methylphenol)) may also contribute such a beneficial effect, albeit perhaps to a lesser extent.

In some embodiments, $R^2$ is of the formula —$C(R^7)(R^8)$— wherein $R^7$ and $R^8$ form a ring together that includes one or more heteroatoms. In one such embodiment, the ring formed by $R^7$ and $R^8$ further includes one or more additional cyclic group such as, e.g., one or more aryl cyclic groups (e.g., two phenylene rings).

In one embodiment, $R^2$ is of the formula —$C(R^7)(R^8)$— wherein at least one of $R^7$ and $R^8$ form a ring with an $R^1$ of the depicted phenylene group. In one such embodiment, each of $R^7$ and $R^8$ forms such a ring with a different depicted phenylene group.

In some embodiments, the segment of Formula (I) does not include any ester linkages in a backbone of $R^2$ connecting the pair of depicted phenylene groups. In some embodiments, the polymer of the present invention does not include any backbone ester linkages.

The oxygen atom of a phenylene ring(s) depicted in Formula (I) can be positioned on the ring at any position relative to $R^2$ (or relative to the other phenylene ring if $R^2$ is absent). In some embodiments, the oxygen atom (which is preferably an ether oxygen) and $R^2$ are located at para positions relative to one another. In other embodiments, the oxygen atom and $R^2$ may be located ortho or meta to one another.

The segments of Formula (I) can be of any suitable size. Typically, the segments of Formula (I) will have an atomic weight of less than 1,000, less than 600, or less than 400 Daltons. More typically, the segments of Formula (I) will have an atomic weight of about 100 to about 400 Daltons.

In preferred embodiments, the polymer of the present invention includes a plurality of segments of Formula (I), which are preferably dispersed throughout a backbone of the polymer, more preferably a polyether backbone. In preferred embodiments, the segments of Formula (I) constitute a substantial portion of the overall mass of the polymer. Typically, segments of Formula (I) constitute at least 10 weight percent ("wt-%"), preferably at least 30 wt-%, more preferably at least 40 wt-%, even more preferably at least 50 wt-%, and optimally at least 55 wt-% of the polymer.

The weight percent of segments of Formula (I) in the polymer of the present invention may be below the amounts recited above in certain situations, and can even be substantially below. By way of example, the concentration of segments of Formula (I) may be outside the ranges recited above if the polymer of the present invention, which is preferably a polyether polymer, includes large molecular weight additional components such as may occur, for example, when the polymer is a copolymer such as an acrylic-containing copolymer (e.g., an acrylic-polyether copolymer formed by grafting acrylic onto a polyether polymer of the present invention). In such embodiments, the weight percent of segments of Formula (I) present in the polymer is preferably as described above (e.g., ≥10 wt-%, ≥30 wt-%, ≥40 wt-%, ≥50 wt-%, ≥55 wt-%), based on the weight percent of segments of Formula (I) relative to the total polyether fraction of the polymer (while not considering the total weight of non-polyether portions such as, for example, acrylic portions). In general, the total polyether fraction of the polymer can be calculated based on the total weight of polyepoxide and polyhydric phenol reactants incorporated into the polymer.

Depending upon the particular embodiment, the polymer of the present invention is preferably amorphous or semi-crystalline.

The polymer can include branching, if desired. In preferred embodiments, however, the polymer of the invention is a linear or substantially linear polymer.

If desired, the backbone of the polymer may include step-growth linkages (e.g., condensation linkages) other than ether linkages (e.g., in addition to, or in place of, the ether linkages) such as, for example, amide linkages, carbonate linkages, ester linkages, urea linkages, urethane linkages, etc. Thus, for example, in some embodiments, the backbone may include both ester and ether linkages. In some embodiments, the backbone of the polymer does not include any condensation linkages or other step-growth linkages other than ether linkages.

The polymer of the present invention preferably includes hydroxyl groups. In preferred embodiments, the polymer includes a plurality of hydroxyl groups attached to the backbone. In preferred embodiments, polyether portions of the polymer backbone include secondary hydroxyl groups distributed throughout. Preferred secondary hydroxyl groups are present in —$CH_2$—$CH(OH)$—$CH_2$— or —$CH_2$—$CH_2$—$CH(OH)$— segments, which are preferably derived from an oxirane group. Such segments may be formed, for example, via reaction of an oxirane group and a hydroxyl group (preferably a hydroxyl group of a polyhydric phenol). In some embodiments, $CH_2$—$CH(OH)$—$CH_2$— or $CH_2$—$CH_2$—$CH(OH)$— segments are attached to each of the ether oxygen atoms of preferred segments of Formula (I).

The backbone of the polymer of the present invention may include any suitable terminal groups, including, for example, epoxy and/or hydroxyl groups (e.g., a hydroxyl group attached to a terminal aryl or heteroaryl ring).

In preferred embodiments, the polymer of the present invention is formed using reactants that include at least one polyepoxide compound, more typically at least one diepoxide compound. Although any suitable ingredients may be used to form the polymer, in presently preferred embodiments, the polymer is formed via reaction of ingredients that include: (a) one or more polyepoxides, more preferably one or more diepoxides, and (b) one or more polyols, more preferably one or more polyhydric phenols, and even more preferably one or more dihydric phenols.

While it is contemplated that the segments of Formula (I) may be incorporated into the polymer using ingredients other than a polyepoxide compound, in preferred embodiments some, or all, of the segments of Formula (I) are incorporated into the polymer using a polyepoxide compound, and more preferably a diepoxide compound. The polyepoxide compound may be upgraded by reaction with an extender (e.g., a diol) to form a binder polymer, more preferably a polyether binder polymer, of a suitable molecular weight using any suitable extender or combinations of extenders. As discussed above, diols (e.g., polyhydric phenols, and dihydric phenols in particular) are preferred extenders. Examples of other suitable extenders may include polyacids (and diacids in particular) or phenol compounds having both a phenol hydroxyl group and a carboxylic group (e.g., para hydroxy benzoic acid and/or para hydroxy phenyl acetic acid). Conditions for such reactions are generally carried out using standard techniques that are known to one of skill in the art or that are exemplified in the examples section.

The epoxy groups (also commonly referred to as "oxirane" groups) of the polyepoxide compound may be attached to the compound via any suitable linkage, including, for example, ether-containing or ester-containing linkages. Glycidyl ethers of polyhydric phenols and glycidyl esters of polyhydric phenols are preferred polyepoxide compounds, with diglycidyl ethers being particularly preferred.

A preferred polyepoxide compound for use in incorporating segments of Formula (I) into the polymer of the present invention is depicted in the below Formula (II):

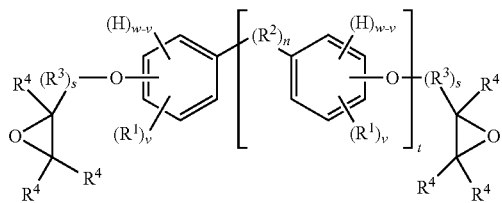

Formula (II)

wherein:
  $R^1$, $R^2$, n, t, v, and w are as described above for Formula (I);
  s is 0 to 1, more preferably 1;
  $R^3$, if present, is a divalent group, more preferably a divalent organic group; and
  preferably each $R^4$ is independently a hydrogen atom, a halogen atom, or a hydrocarbon group that may include one or more heteroatoms; more preferably each $R^4$ is a hydrogen atom.

When t is 1, the polyepoxide of Formula (II) is a segment of the below Formula (IIA).

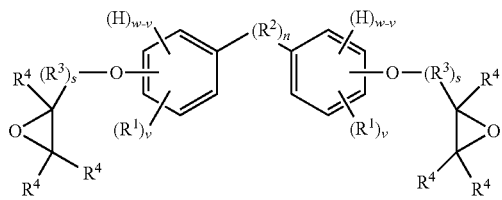

Formula (IIA)

When t is 0, the polyepoxide of Formula (II) is a segment of the below Formula (IIB).

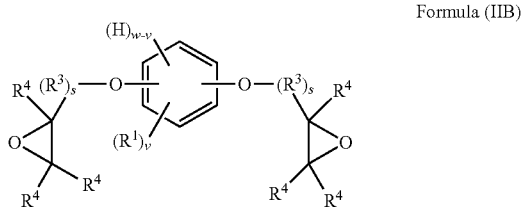

Formula (IIB)

$R^3$ is typically a hydrocarbyl group, which may optionally include one or more heteroatoms. Preferred hydrocarbyl groups include groups having from one to four carbon atoms, with methylene groups being particularly preferred. In some embodiments, $R^3$ includes a carbonyl group. In one such embodiment, $R^3$ includes a carbonyl group that is attached to the oxygen atom depicted in Formula (II) (e.g., as in an ester linkage).

In presently preferred embodiments, $R^4$ is a hydrogen atom.

Preferred polyepoxide compounds of Formula (II) are non-mutagenic, more preferably non-genotoxic. A useful test for assessing both mutagenicity and genotoxicity is the mammalian in vivo assay known as the in vivo alkaline single cell gel electrophoresis assay (referred to as the "comet" assay). The method is described in: Tice, R. R. "The single cell gel/comet assay: a microgel electrophoretic technique for the detection of DNA damage and repair in individual cells." *Environmental Mutagenesis*. Eds. Phillips, D. H. and Venitt, S. Bios Scientific, Oxford, UD, 1995, pp. 315-339. A negative test result in the comet assay indicates that a compound is non-genotoxic and, therefore, non-mutagenic, though a positive test does not definitively indicate the opposite and in such cases a more definitive test may be utilized (e.g., a two-year rat feeding study).

If t of Formula (II) is 0, v is preferably 1 or more, more preferably 2 or more. While not intending to be bound by any theory, it is believed that the presence of one or more $R^1$ groups, and particularly one or more ortho $R^1$ groups, can contribute to the diepoxide of Formula (IIB) being non-genotoxic. By way of example, 2,5-di-tert-butylhydroquinone is non-genotoxic.

In some embodiments, the polyepoxide compound of Formula (II) is formed via epoxidation of a dihydric phenol compound (e.g., via a reaction using epichlorohydrin or any other suitable material). Such a dihydric phenol compound is depicted in the below Formula (III), wherein $R^1$, $R^2$, n, t, v, and w are as in Formula (I):

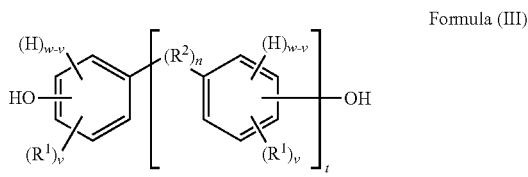

Formula (III)

When t is 1, the compound of Formula (III) is of the below Formula (IIIA).

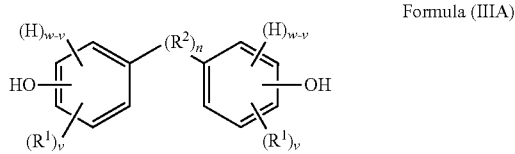

Formula (IIIA)

When t is 0, the compound of Formula (III) is of the below Formula (IIIB).

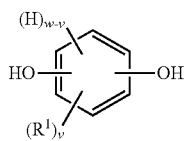

Formula (IIIB)

Preferred compounds of Formula (III) do not exhibit appreciable estrogenic activity. Preferred appreciably non-estrogenic compounds exhibit a degree of estrogen agonist activity, in a competent in vitro human estrogen receptor assay, that is preferably less than that exhibited by 4,4'-(propane-2,2-diyl)diphenol in the assay, even more preferably less than that exhibited by bisphenol S in the assay, even more preferably less than that exhibited by 4,4'-(propane-2,2-diyl)bis(2,6-dibromophenol) in the assay, and optimally less than about that exhibited by 2,2-bis(4-hydroxyphenyl)propanoic acid in the assay.

The MCF-7 assay is a useful test for assessing whether a polyhydric phenol compound is appreciably non-estrogenic. The MCF-7 assay uses MCF-7, clone WS8, cells to measure whether and to what extent a substance induces cell proliferation via estrogen receptor (ER)-mediated pathways. The method is described in "Test Method Nomination: MCF-7 Cell Proliferation Assay of Estrogenic Activity" submitted for validation by CertiChem, Inc. to the National Toxicology Program Interagency Center for the Evaluation of Alternative Toxicological Methods (NICEATM) on Jan. 19, 2006 (available online at http://iccvam.niehs.nih.gov/methods/endocrine/endodocs/SubmDoc.pdf).

A brief summary of the method of the aforementioned MCF-7 assay is provided below. MCF-7, clone WS8, cells are maintained at 37° C. in RMPI (or Roswell Park Memorial Institute medium) containing Phenol Red (e.g., GIBCO Catalog Number 11875119) and supplemented with the indicated additives for routine culture. An aliquot of cells maintained at 37° C. are grown for 2 days in phenol-free media containing 5% charcoal stripped fetal bovine serum in a 25 cm² tissue culture flask. Using a robotic dispenser such as an epMotion 5070 unit, MCF-7 cells are then seeded at 400 cells per well in 0.2 ml of hormone-free culture medium in Corning 96-well plates. The cells are adapted for 3 days in the hormone-free culture medium prior to adding the chemical to be assayed for estrogenic activity. The media containing the test chemical is replaced daily for 6 days. At the end of the 7-day exposure to the test chemical, the media is removed, the wells are washed once with 0.2 ml of HBSS (Hanks' Balanced Salt Solution), and then assayed to quantify amounts of DNA per well using a micro-plate modification of the Burton diphenylamine (DPA) assay, which is used to calculate the level of cell proliferation.

Examples of appreciably non-estrogenic polyhydric phenols include polyhydric phenols that, when tested using the MCF-7 assay, exhibit a Relative Proliferative Effect ("RPE") having a logarithmic value (with base 10) of less than about −2.0, more preferably an RPE of −3 or less, and even more preferably an RPE of −4 or less. RPE is the ratio between the EC50 of the test chemical and the EC50 of the control substance 17-beta estradiol times 100, where EC50 is "effective concentration 50%" or half-maximum stimulation concentration for cell proliferation measured as total DNA in the MCF-7 assay.

A Table is provided below that includes some exemplary preferred polyhydric compounds of Formula (III) and their expected or measured logarithmic RPE values in the MCF-7 assay. The structures of some of the compounds included in the Table are provided following the Table, with the number listed below each structure corresponding to that listed in the Table.

| Polyhydric Compound of Formula (III) | Structure | Reference Compound | Log RPE |
|---|---|---|---|
| | | 17β-estradiol | 2.00 |
| | | diethylstilbestrol | about 2 |
| | | dienestrol | about 2 |
| | | Genistein | −2 |
| Bisphenol S (not preferred) | | | −2 |
| Bisphenol F (not preferred) | | | −2 |
| 4,4'-(propane-2,2-diyl)bis(2,6-dibromophenol) | 16 | | −3 |
| 4,4',4''-(ethane-1,1,1-triyl)triphenol | 3 | | −3 |
| 4,4'-(1-phenylethane-1,1-diyl)diphenol | 4 | | −3 |
| 2,2-bis(4-hydroxyphenyl)propanoic acid | 5 | | less than −4 |
| 4,4'-butylidenebis(2-t-butyl-5-methylphenol) | 7 | | less than −4 |
| 4,4'-(1,4-phenylenebis(propane-2,2-diyl))diphenol | 10 | | less than −4 |
| 2,2'methylenebis(phenol) | 11 | | less than −4 |
| 2,5-di-t-butylhydroquinone | 12 | | less than −4 |

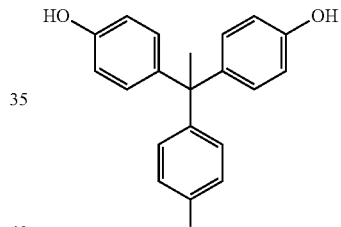

3

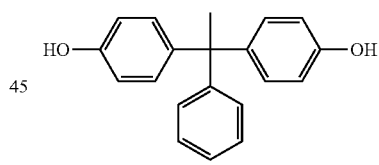

4

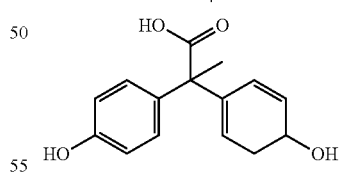

5

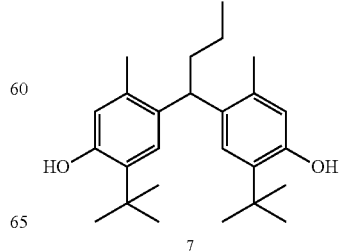

7

| Polyhydric Compound of Formula (III) | Structure | Reference Compound | Log RPE |
|---|---|---|---|

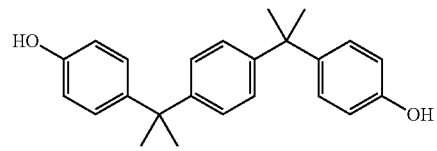
10

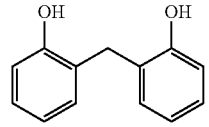
11

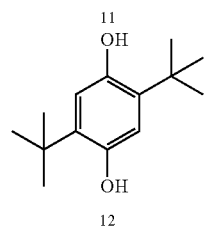
12

Compounds having no appreciable estrogenic activity may be beneficial in the event that any unreacted, residual compound may be present in a cured coating composition. While the balance of scientific data does not indicate that the presence in cured coatings of very small amounts of residual compounds having estrogenic activity in an in vitro recombinant cell assay pose a human health concern, the use of compounds having no appreciable estrogenic activity in such an assay may nonetheless be desirable from a public perception standpoint. Thus, in preferred embodiments, the polymer of the present invention is preferably formed using polyhydric phenol compounds that do not exhibit appreciable estrogenic activity in the MCF-7 assay.

It is believed that the inhibition/elimination of estrogenic activity may be attributable to one or more of the following: (a) the compound having an arranged molecular weight due to the presence of the one or more substituent groups, (b) the presence of polar groups and/or (c) ortho hydroxyl groups relative to $R^2$.

It is believed that molecular weight may be a structural characteristic pertinent to whether a polyhydric phenol is appreciably non-estrogenic. For example, while not intending to be bound by any theory, it is believed that if a sufficient amount of relatively "densely" packed molecular weight is present in a polyhydric phenol, it can prevent the compound from being able to fit into the active site of an estrogen receptor. In some embodiments, it may be beneficial to form a polyether polymer from one or more polyhydric phenols that includes at least the following number of carbon atoms: 20, 21, 22, 23, 24, 25, or 26 carbon atoms. In one such embodiment, a polyhydric phenol of Formula (III) is used to make the polyether polymer, where (a) v is independently 0 to 3 and (b) $R^2$ is of the formula —C($R^7$)($R^8$)— and includes at least 8, at least 10, at least 12, or at least 14 carbon atoms (or otherwise has an $R^2$ of sufficiently high atomic weight to prevent the compound from fitting into the active site).

The presence of one or more polar groups on the polyhydric phenol compounds of Formula (III) may be beneficial in certain embodiments, particularly for certain embodiment of Formula (IIIA). The polar groups may be located at any suitable location of the compounds of Formula (III), including in $R^1$ or $R^2$. Suitable polar groups may include ketone, carboxyl, carbonate, hydroxyl, phosphate, sulfoxide, and the like, any other polar groups disclosed herein, and combinations thereof.

The below compounds of Formula (III) may also be used in certain embodiments if desired.

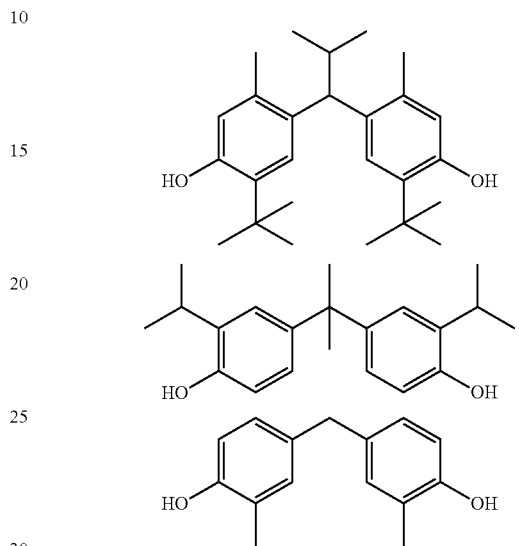

The below compounds are not presently preferred, but may be used in certain embodiments, if desired.

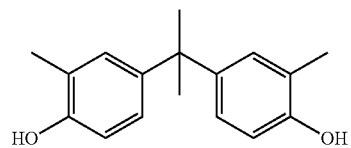

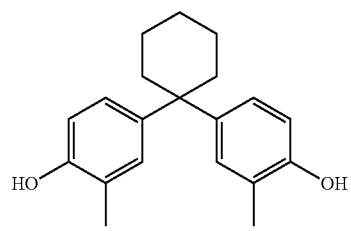

Additional diphenol compounds that may have utility in producing the polymer of the present invention are provided below. Such compounds are believed to be appreciably non-estrogenic for one or more of the reasons previously described herein.

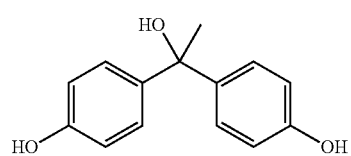

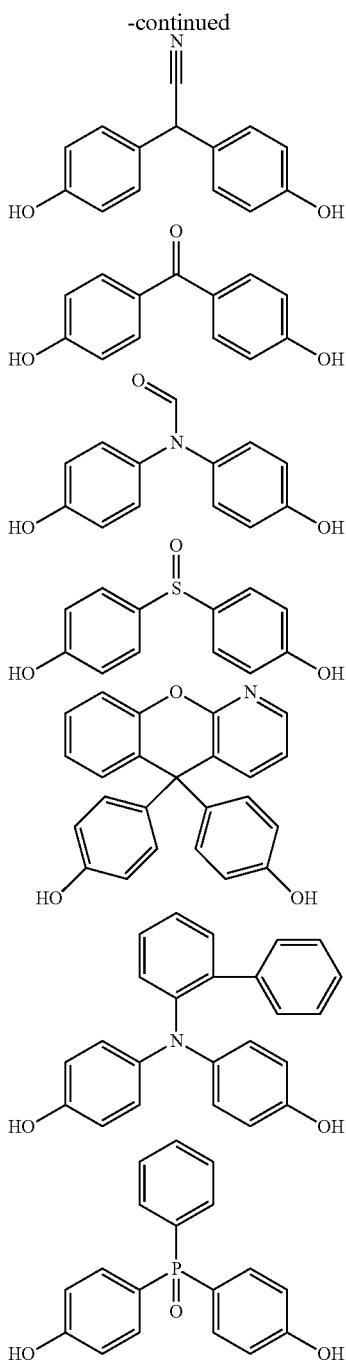

Dihydric phenol compounds of Formula (III) can be converted to a diepoxide using any suitable process and materials. The use of epichlorohydrin in the epoxidation process is presently preferred.

The term "upgrade dihydric phenol" is used hereinafter to refer to a polyhydric phenol capable of participating in a reaction with the polyepoxide of Formula (II) to build molecular weight and preferably form a polymer. Any suitable upgrade polyhydric phenol may be used in forming a polymer of the present invention. However, the use of bisphenol A is not preferred. Preferred upgrade dihydric phenols are free of bisphenol A and preferably do not exhibit appreciable estrogenic activity.

Examples of suitable upgrade dihydric phenols for use in forming the polyether polymer include any of the compounds of Formula (III), with compounds of Formula (III) in which the hydroxyl group are unhindered by adjacent R groups being generally preferred for purposes of reaction efficiency. Some specific examples of suitable upgrade dihydric phenols include hydroquinone, catechol, p-tert-butyl catechol, resorcinol, substituted variants thereof (e.g., substituted catechols such as 3-methylcatechol, 4-methylcatechol, 4-tert-butyl catechol, and the like; substituted hydroquinones such as methylhydroquinone, 2,5-dimethylhydroquinone, trimethylhydroquinone, tetramethylhydroquinone, ethylhydroquinone, 2,5-diethylhydroquinone, triethylhydroquinone, tetraethylhydroquinone, tert-butylhydroquinone, 2,5-di-tert-butylhydroquinone, and the like; and substituted resorcinols such as 2-methylresorcinol, 4-methyl resorcinol, 2,5-dimethylresorcinol, 4-ethylresorcinol, 4-butylresorcinol, 4,6-di-tert-butylresorcinol, 2,4,6-tri-tert-butylresorcinol, and the like), or a mixture thereof. Hydroquinone is a presently preferred compound.

In some embodiments, the upgrade dihydric phenol is a compound of Formula III and includes an $R^2$ group having one or more cyclic groups (e.g., alicyclic and/or aromatic groups), which may be monocyclic or polycyclic groups (e.g., a divalent: norbornane, norbornene, tricyclodecane, bicyclo[4.4.0] decane, or isosorbide group, or a combination thereof). In some embodiments, $R^2$ of the upgrade dihydric phenol includes one or more ester linkages. For example, in some embodiments, $R^2$ is a —$R^6_w$—Z—$R^5$—Z—$R^6_w$— segment, where: $R^5$ is a divalent organic group; each $R^6$, if present, is independently a divalent organic group; each Z is independently an ester linkage that can be of either directionality (e.g., —C(O)—O— or —O—C(O)—; and each w is independently 0 or 1. In one such embodiment, $R^5$-includes at least one divalent cyclic group such as, for example, a divalent polycyclic group, a divalent aryl or heteroarylene group (e.g., a substituted or unsubstituted phenylene group) or a divalent alicyclic group (e.g., a substituted or unsubstituted cyclohexane or cyclohexene group). In one embodiment, $R^2$ is —$R^6_w$—C(O)—O—$R^5$—O—C(O)—$R^6_w$—. A further discussion of suitable segments containing ester linkages and materials for incorporating such segments into the polymer of the invention is provided in U.S. Published Application No. 2007/0087146 by Evans et. al. and Published International Application No. WO 2011/130671 by Niederst et al.

By way of example, an upgrade dihydric phenol having a cyclic-group-containing $R^2$ may be formed by reacting (a) a suitable amount (e.g., about 2 moles) of a Compound A having a phenol hydroxyl group and a carboxylic acid or other active hydrogen group with (b) a suitable amount (e.g., about 1 mole) of a di-functional or higher Compound B having one or more cyclic groups (monocyclic and/or polycyclic) and two or more active hydrogen groups capable of reacting with the active hydrogen group of Compound A. Examples of preferred Compounds A include 4-hydroxy phenyl acetic acid, 3-hydroxybenzoic acid, 4-hydroxybenzoic acid, and derivatives or mixtures thereof. Examples of preferred Compounds B include cyclic-containing diols such as cyclohexane dimethanol (CHDM); tricyclodecane dimethanol (TCDM); 2,2,4,4-Tetramethyl-1,3-cyclobutanediol; a polycyclic anyhdrosugar such as isosorbide, isomannide, or isoidide; and derivatives or mixtures thereof. In some embodiments, the cyclic group may be formed after reaction of Compounds A and B. For example, a Diels-Alder reaction (using, e.g., cyclopentadiene as a reactant) could be used to incorporate an unsaturated bicyclic group such as a norbornene group into Compound B, in which case Compound B in its unreacted form would need to include at least one non-aromatic carbon-carbon double bond in order to participate in the Diels-Alder reaction. For further discussion of suitable materials and techniques relating to such Diels-Alder reactions see, for example, Published International App. Nos. WO 2010/118356 by Skillman et al. and WO 2010/118349 by Hayes et al.

Some examples of cyclic-group-containing and ester-link-containing upgrade dihydric phenol compounds are provided below. These compounds are discussed in further detail in the previously referenced Published International Application No. WO 2011/130671 by Niederst et al.

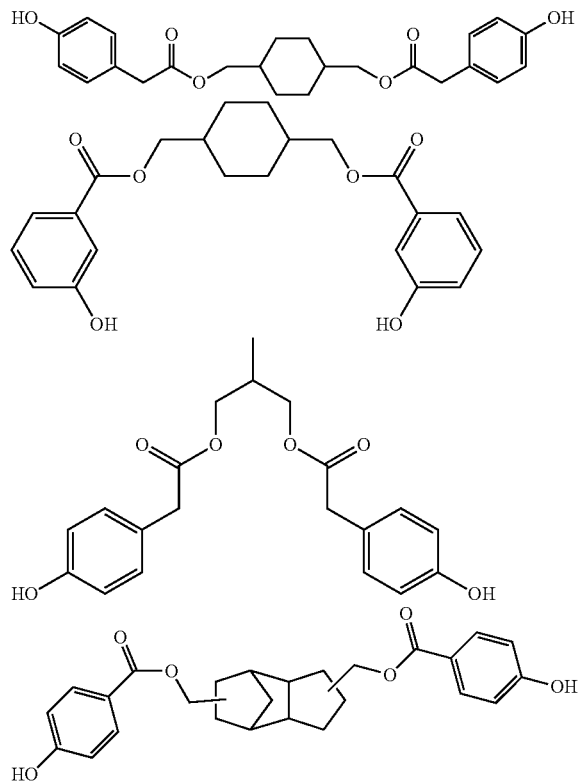

It is also contemplated that the polymer of the present invention may be formed via reaction of ingredients including the dihydric phenol compound of Formula (III) and a diepoxide other than that of Formula (II). Examples of such compounds include compounds such as 1,4-cyclohexanedimethanol diglycidyl ether (CHDMDGE), neopentyl glycol diglycidyl ether, 2-methyl-1,3-propanediol diglycidyl ether, tricyclodecane dimethanol diglycidyl ether, diepoxides of tetra methyl cyclobutanediol (e.g., the diglycidyl ether of 1,3-dihydroxy-2,2,4,4,tetramethylcyclobutane), alternative diepoxides thereof (e.g., diepoxides other the diglycidyl ethers), and combinations thereof. While not intending to be bound by any theory, some such aliphatic diepoxides (e.g., CHDMDGE and neopentyl glycol diglycidyl ether) that tend to yield polymers having lower Tg values may not be suitable for certain interior packaging coating applications in which a relatively high Tg polymer is desirable for purposes of corrosion resistance, although they may be suitable for exterior packaging coating applications or other end uses.

If desired, one or more comonomers and/or co-oligomers may be included in the reactants used to generate the polymer of the present invention. Non-limiting examples of such materials include adipic acid, azelaic acid, terephthalic acid, isophthalic acid, and combinations thereof. The comonomers and/or cooligomers may be included in an initial reaction mixture of polyepoxide and polyhydric phenol and/or may be post-reacted with the resulting polyether oligomer or polymer. In presently preferred embodiments, a comonomer and/or co-oligomer is not utilized to produce a polyether polymer of the present invention.

Preferred polymers of the present invention may be made in a variety of molecular weights. Preferred polyether polymers of the present invention have a number average molecular weight (Mn) of at least 2,000, more preferably at least 3,000, and even more preferably at least 4,000. The molecular weight of the polyether polymer may be as high as is needed for the desired application. Typically, however, the Mn of the polyether polymer, when adapted for use in a liquid coating composition, will not exceed about 11,000. In some embodiments, the polyether polymer has an Mn of about 5,000 to about 8,000. In embodiments where the polymer of the present invention is a copolymer, such as for example a polyether-acrylic copolymer, the molecular weight of the overall polymer may be higher than that recited above, although the molecular weight of the polyether polymer portion will typically be as described above. Typically, however, such copolymers will have an Mn of less than about 20,000.

The polymer of the present invention may exhibit any suitable polydispersity index (PDI). In embodiments in which the polymer is a polyether polymer intended for use as a binder polymer of a liquid applied packaging coating (e.g., a food or beverage can coating), the polyether polymer will typically exhibit a PDI of from about 1.5 to 5, more typically from about 2 to 3.5, and in some instances from about 2.2 to 3 or about 2.4 to 2.8.

Advancement of the molecular weight of the polymer may be enhanced by the use of a catalyst in the reaction of a diepoxide with one or more upgrade comonomers such as, e.g., a polyhydric phenol of Formula (IV). Typical catalysts usable in the advancement of the molecular weight of the epoxy material of the present invention include amines, hydroxides (e.g., potassium hydroxide), phosphonium salts, and the like. A presently preferred catalyst is a phosphonium catalyst. The phosphonium catalyst useful in the present invention is preferably present in an amount sufficient to facilitate the desired condensation reaction.

Alternatively, epoxy-terminated polymers of the present invention may be reacted with fatty acids to form polymers having unsaturated (e.g., air oxidizable) reactive groups, or with acrylic acid or methacrylic acid to form free-radically curable polymers.

Advancement of the molecular weight of the polymer may also be enhanced by the reaction of a hydroxyl- or epoxy-terminated polymer of the present invention with a suitable diacid (such as adipic acid).

As discussed above, in certain preferred embodiments, the coating composition of the present invention is suitable for use in forming a food-contact packaging coating. In order to exhibit a suitable balance of coating properties for use as a food-contact packaging coating, including suitable corrosion resistance when in prolonged contact with packaged food or beverage products which may be of a corrosive nature, the polymer of the present invention preferably has a glass transition temperature ("Tg") of at least 60° C., more preferably at least 70° C., and even more preferably at least 80° C. In preferred embodiments, the Tg is less than 150° C., more preferably less than 130° C., and even more preferably less than 110° C. Tg can be measured via differential scanning calorimetry ("DSC") using the methodology disclosed in the Test Methods section. In preferred embodiments, the polymer is a polyether polymer exhibiting a Tg pursuant to the aforementioned Tg values.

While not intending to be bound by any theory, it is believed that it is important that the polymer exhibit a Tg such as that described above in applications where the coating composition will be in contact with food or beverage products during retort processing at high temperature (e.g., at temperatures at or above about 100° C. and sometimes accompanied by pressures in excess of atmospheric pressure), and particularly when retort processing food or beverage products that are more chemically aggressive in nature. It is contemplated that, in some embodiments, such as, for example, where the coating composition is intended for use as an exterior varnish on a food or beverage container, the Tg of the polymer may be less than that described above (e.g., as low as about 30° C.) and the coating composition may still exhibit a suitable balance of properties in the end use.

When the Tg of a polymer is referenced herein in the context of a coating composition including the polymer or a coated article coated with such a coating composition, the indicated Tg value for the polymer refers to the Tg of the polymer prior to any cure of a coating composition including the polymer.

While not intending to be bound by any theory, it is believed that the inclusion of a sufficient number of aryl and/or heteroaryl groups (typically phenylene groups) in the binder polymer of the present invention is an important factor for achieving suitable coating performance for food-contact packaging coatings, especially when the product to be packaged is a so called "hard-to-hold" food or beverage product. Sauerkraut is an example of a hard-to-hold product. In preferred embodiments, aryl and/or heteroaryl groups constitute at least 25 wt-%, more preferably at least 30 wt-%, even more preferably at least 35 wt-%, and optimally at least 45 wt-% of the polyether polymer, based on the total weight of aryl and heteroaryl groups in the polymer relative to the weight of the polyether polymer. The upper concentration of aryl/heteroaryl groups is not particularly limited, but preferably the amount of such groups is configured such that the Tg of the polyether polymer is within the Tg ranges previously discussed. The total amount of aryl and/or heteroaryl groups in the polyether polymer will typically constitute less than about 80 wt-%, more preferably less than 75 wt-%, even more preferably less than about 70 wt-%, and optimally less than 60 wt-% of the polyether polymer. The total amount of aryl and/or heteroaryl groups in the polyether polymer can be determined based on the weight of aryl- or heteroaryl-containing monomer incorporated into the polyether polymer and the weight fraction of such monomer that constitutes aryl or heteroaryl groups. In embodiments where the polymer is a polyether copolymer (e.g., a polyether-acrylic copolymer), the weight fraction of aryl or heteroaryl groups in the polyether polymer portion(s) of the copolymer will generally be as described above, although the weight fraction relative to the total weight of the copolymer may be less.

Preferred aryl or heteroaryl groups include less than 20 carbon atoms, more preferably less than 11 carbon atoms, and even more preferably less than 8 carbon atoms. The aryl or heteroaryl groups preferably have at least 4 carbon atoms, more preferably at least 5 carbon atoms, and even more preferably at least 6 carbon atoms. Substituted or unsubstituted phenylene groups are preferred aryl or heteroaryl groups. Thus, in preferred embodiments, the polyether fraction of the polymer includes an amount of phenylene groups pursuant to the amounts recited above.

In one embodiment, the polymer of the present invention does not include any structural units derived from hydrogenated bisphenol A or a diepoxide of hydrogenated bisphenol A.

The polymers of the present invention can be applied to a substrate as part of a coating composition that includes a liquid carrier. The liquid carrier may be water, organic solvent, or mixtures of various such liquid carriers. Accordingly, liquid coating compositions of the present invention may be either water-based or solvent-based systems. Examples of suitable organic solvents include glycol ethers, alcohols, aromatic or aliphatic hydrocarbons, dibasic esters, ketones, esters, and the like, and combinations thereof. Preferably, such carriers are selected to provide a dispersion or solution of the polymer for further formulation.

It is expected that a polyether polymer of the present invention may be substituted for any conventional epoxy polymer present in a packaging coating composition known in the art. Thus, for example, the polyether polymer of the present invention may be substituted, for example, for a BPA/BADGE-containing polymer of an epoxy/acrylic latex coating system, for a BPA/BADGE-containing polymer of a solvent based epoxy coating system, etc. The amount of binder polymer of the present invention included in coating compositions may vary widely depending on a variety of considerations such as, for example, the method of application, the presence of other film-forming materials, whether the coating composition is a water-based or solvent-based system, etc. For liquid-based coating compositions, however, the binder polymer of the present invention will typically constitute at least 10 wt-%, more typically at least 30 wt-%, and even more typically at least 50 wt-% of the coating composition, based on the total weight of resin solids in the coating composition. For such liquid-based coating compositions, the binder polymer will typically constitute less than about 90 wt-%, more typically less than about 80 wt-%, and even more typically less than about 70 wt-% of the coating composition, based on the total weight of resin solids in the coating composition.

In one embodiment, the coating composition is an organic solvent-based composition preferably having at least 20 wt-% non-volatile components ("solids"), and more preferably at least 25 wt-% non-volatile components. Such organic solvent-based compositions preferably have no greater than 40 wt-% non-volatile components, and more preferably no greater than 25 wt-% non-volatile components. For this embodiment, the non-volatile film-forming components preferably include at least 50 wt-% of the polymer of the present invention, more preferably at least 55 wt-% of the polymer, and even more preferably at least 60 wt-% of the polymer. For this embodiment, the non-volatile film-forming components preferably include no greater than 95 wt-% of the polymer of the present invention, and more preferably no greater than 85 wt-% of the polymer.

In some embodiments, the coating composition of the present invention is a solvent-based system that includes no more than a de minimus amount of water (e.g., less than 2 wt-% of water), if any. One example of such a coating composition is a solvent-based coating composition that includes no more than a de minimus amount of water and includes: on a solids basis, from about 30 to 99 wt-%, more preferably from about 50 to 85 wt-% of polyether polymer of the present invention; a suitable amount of crosslinker (e.g., a phenolic crosslinker or anhydride crosslinker); and optionally inorganic filler (e.g., $TiO_2$) or other optional additives. In one such solvent-based coating composition of the present invention, the polyether polymer is a high molecular weight polyether polymer that preferably has an $M_n$ of about 7,500 to about 10,500, more preferably about 8,000 to 10,000, and even more preferably about 8,500 to about 9,500.

In one embodiment, the coating composition is a water-based composition preferably having at least 15 wt-% non-volatile components. In one embodiment, the coating composition is a water-based composition preferably having no greater than 50 wt-% non-volatile components, and more preferably no greater than 40 wt-% non-volatile components. For this embodiment, the non-volatile components preferably include at least 5 wt-% of the polymer of the present invention, more preferably at least 25 wt-% of the polymer, even more preferably at least 30 wt-% of the polymer, and optimally at least 40 wt-% of the polymer. For this embodiment, the non-volatile components preferably include no greater than 70 wt-% of the polymer of the present invention, and more preferably no greater than 60 wt-% of the polymer.

If a water-based system is desired, techniques may be used such as those described in U.S. Pat. Nos. 3,943,187; 4,076,676; 4,247,439; 4,285,847; 4,413,015; 4,446,258; 4,963,602; 5,296,525; 5,527,840; 5,830,952; 5,922,817; 7,037,584; and 7,189,787. Water-based coating systems of the present invention may optionally include one or more organic solvents, which will typically be selected to be miscible in water. The liquid carrier system of water-based coating compositions will typically include at least 50 wt-% of water, more typically at least 75 wt-% of water, and in some embodiments more than 90 wt-% or 95 wt-% of water. Any suitable means may be used to render the polymer of the present invention miscible in water. For example, the polymer may include a suitable amount of salt groups such as ionic or cationic salt groups to render the polymer miscible in water (or groups capable of forming such salt groups). Neutralized acid or base groups are preferred salt groups.

In some embodiments, the polymer of the present invention is covalently attached to one or more materials (e.g., oligomers or polymers) having salt or salt-forming groups to render the polymer water-dispersible. The salt or salt-forming group containing material may be, for example, oligomers or polymers that are (i) formed in situ prior to, during, or after formation of the polymer of the present invention or (ii) provided as preformed materials that are reacted with a preformed, or nascent, polymer of the present invention. The covalent attachment may be achieved through any suitable means including, for example, via reactions involving carbon-carbon double bonds, hydrogen abstraction (e.g., via a reaction involving benzoyl peroxide mediated grafting via hydrogen abstraction such as, e.g., described in U.S. Pat. No. 4,212,781), or the reaction of complimentary reactive functional groups such as occurs, e.g., in condensation reactions. In one embodiment, a linking compound is utilized to covalently attach the polyether polymer and the salt- or salt-forming-group-containing material. In certain preferred embodiments, the one or more materials having salt or salt-forming groups is an acrylic material, more preferably an acid- or anhydride-functional acrylic material.

In one embodiment, a water-dispersible polymer may be formed from preformed polymers (e.g., (a) an oxirane-functional polymer, such as, e.g., a polyether polymer, preferably having at least one segment of Formula (I) and (b) an acid-functional polymer such as, e.g., an acid-functional acrylic polymer) in the presence of an amine, more preferably a tertiary amine. If desired, an acid-functional polymer can be combined with an amine, more preferably a tertiary amine, to at least partially neutralize it prior to reaction with an oxirane-functional polymer preferably having at least one segment of Formula (I).

In another embodiment, a water-dispersible polymer may be formed from an oxirane-functional polymer (more preferably a polyether polymer described herein) preferably having at least one segment of Formula (I) that is reacted with ethylenically unsaturated monomers to form an acid-functional polymer, which may then be neutralized, for example, with a base such as a tertiary amine. Thus, for example, in one embodiment, a water-dispersible polymer preferably having at least one segment of Formula (I) may be formed pursuant to the acrylic polymerization teachings of U.S. Pat. Nos. 4,285,847 and/or 4,212,781, which describe techniques for grafting acid-functional acrylic groups (e.g., via use of benzoyl peroxide) onto epoxy-functional polymers. In another embodiment, acrylic polymerization may be achieved through reaction of ethylenically unsaturated monomers with unsaturation present in the polymer preferably containing at least one segment of Formula (I). See, for example, U.S. Pat. No. 4,517,322 and/or U.S. Published Pat. Application No. 2005/0196629 for examples of such techniques.

In another embodiment, a water-dispersible polymer may be formed having the structure E-L-A, wherein E is an epoxy portion of the polymer formed from a polyether polymer described herein, A is a polymerized acrylic portion of the polymer, and L is a linking portion of the polymer which covalently links E to A. Such a polymer can be prepared, for example, from (a) a polyether polymer described herein preferably having about two epoxy groups, (b) an unsaturated linking compound preferably having (i) a carbon-carbon double bond, a conjugated carbon-carbon double bonds or a carbon-carbon triple bond and (ii) a functional group capable of reacting with an epoxy group (e.g., a carboxylic group, a hydroxyl group, an amino group, an amido group, a mercapto group, etc.). Preferred linking compounds include 12 or less carbon atoms, with sorbic acid being an example of a preferred such linking compound. The acrylic portion preferably includes one or more salt groups or salt-forming groups (e.g., acid groups such as present in α,β-ethylenically saturated carboxylic acid monomers). Such polymers may be formed, for example, using a BPA- and BADGE-free polyether polymer of the present invention in combination with the materials and techniques disclosed in U.S. Pat. No. 5,830,952 or U.S. Pub. No. 2010/0068433.

In some embodiments, the coating composition of the present invention is substantially free of acrylic components. For example, in some embodiment the coating composition includes less than about 5 wt-% or less than about 1 wt-% of polymerized acrylic monomers (e.g., a mixture of ethylenically unsaturated monomers that include at least some monomer selected from acrylic acid, methacrylic acid, or esters thereof).

In another embodiment, a polymer preferably containing segments of Formula (I) and including —$CH_2$—$CH(OH)$—$CH_2$— or —$CH^2$—$CH_2$—$CH(OH)$— segments, which are derived from an oxirane, is reacted with an anhydride. This provides acid functionality which, when combined with an amine or other suitable base to at least partially neutralize the acid functionality, is water dispersible.

In some embodiments, the coating composition of the present invention is a low VOC coating compositions that preferably includes no greater than 0.4 kilograms ("kg") of volatile organic compounds ("VOCs") per liter of solids, more preferably no greater than 0.3 kg VOC per liter of solids, even more preferably no greater than 0.2 kg VOC per liter of solids, and optimally no greater than 0.1 kg VOC per liter of solids.

Reactive diluents may optionally be used to yield such low VOC coating compositions. The reactive diluent preferably functions as a solvent or otherwise lowers the viscosity of the blend of reactants. The use of one or more reactive diluents as a "solvent" eliminates or reduces the need to incorporate a substantial amount of other cosolvents (such as butanol) during processing.

Reactive diluents suitable for use in the present invention preferably include free-radical reactive monomers and oligomers. A small amount of reactive diluent that can undergo reaction with the polymer of the present invention may be used (e.g., hydroxy monomers such as 2-hydroxy ethylmethacrylate, amide monomers such as acrylamide, and N-methylol monomers such as N-methylol acrylamide). Suitable reactive diluents include, for example, vinyl compounds, acrylate compounds, methacrylate compounds, acrylamides, acrylonitriles, and the like and combinations thereof. Suitable vinyl compounds include, for example, vinyl toluene, vinyl acetate, vinyl chloride, vinylidene chloride, styrene, substituted styrenes, and the like and combinations thereof. Suitable acrylate compounds include butyl acrylate, ethyl acrylate, 2-ethylhexyl acrylate, isobutyl acrylate, tert-butyl acrylate, methyl acrylate, 2-hydroxyethyl acrylate, poly(ethylene glycol)acrylate, isobornyl acrylate, and combinations thereof. Suitable methacrylate compounds include, for example, butyl methacrylate, methyl methacrylate, ethyl methacrylate, isobutyl methacrylate, 2-hydroxyethyl methacrylate, poly(ethylene glycol)methacrylate, poly(propylene glycol)methacrylate, and the like and combinations thereof. Preferred reactive diluents include styrene and butyl acrylate. U.S. Pat. No. 7,037,584 provides additional discussion of suitable materials and methods relating to the use of reactive diluents in low-VOC packaging coating compositions.

Any suitable amount of one or more reactive diluents may optionally be employed in coating composition of the present invention. For example, an amount of one or more reactive diluents sufficient to achieve the VOC content of the aforementioned low-VOC coating compositions may be used. In some embodiments, the coating composition includes at least about 1 weight percent, at least about 5 weight percent, or at least 10 weight percent of polymerized reactive diluent.

In one embodiment, a polyether polymer of the present invention is blended, in any suitable order, with acrylic component (e.g., acrylic resin) and reactive diluent. The polyether polymer and the acrylic component are preferably reacted with one another (although they may be used as a simple blend), either before or after addition of reactive diluents, to form a polyether-acrylate copolymer. The polyether-acrylate and the reactive diluents are preferably further dispersed in water. The reactive diluent is then preferably polymerized in the presence of the polyether-acrylate copolymer to form a coating composition having the desired low VOC content. In this context, the term "reactive diluent" relates to monomers and oligomers that are preferably essentially non-reactive with the polyether resin or any carboxylic acid moiety (or other functional group) that might be present, e.g., on the acrylic resin, under contemplated blending conditions. The reactive diluents are also preferably capable of undergoing a reaction to form a polymer, described as an interpenetrating network with the polymer of the present invention, or with unsaturated moieties that may optionally be present, e.g., on an acrylic resin.

A coating composition of the present invention may also include other optional ingredients that do not adversely affect the coating composition or a cured coating composition resulting therefrom. Such optional ingredients are typically included in a coating composition to enhance composition esthetics; to facilitate manufacturing, processing, handling, or application of the composition; or to further improve a particular functional property of a coating composition or a cured coating composition resulting therefrom. For example, the composition that includes a polymer of the present invention may optionally include crosslinkers, fillers, catalysts, lubricants, pigments, surfactants, dyes, colorants, toners, coalescents, extenders, anticorrosion agents, flow control agents, thixotropic agents, dispersing agents, antioxidants, oxygen-scavenging materials, adhesion promoters, light stabilizers, and mixtures thereof, as required to provide the desired film properties. Each optional ingredient is preferably included in a sufficient amount to serve its intended purpose, but not in such an amount to adversely affect a coating composition or a cured coating composition resulting therefrom.

Preferred compositions are substantially free of one or both of mobile BPA or mobile BADGE, and more preferably essentially free of these compounds, even more preferably essentially completely free of these compounds, and optimally completely free of these compounds. The coating composition is also preferably substantially free of one or both of bound BPA and bound BADGE, more preferably essentially free of these compounds, even more preferably essentially completely free of these compounds, and optimally completely free of these compounds. In addition, preferred compositions are also substantially free, more preferably essentially free, even more preferably essentially completely free, and optimally completely free of one or more or all of: bisphenol S, bisphenol F, and the diglycidyl ether of bisphenol F or bisphenol S.

It has been discovered that coating compositions incorporating the aforementioned polymer-containing compositions may be formulated using one or more optional curing agents (e.g., crosslinking resins, sometimes referred to as "crosslinkers"). The choice of particular crosslinker typically depends on the particular product being formulated. For example, some coating compositions are highly colored (e.g., gold-colored coatings). These coatings may typically be formulated using crosslinkers that themselves tend to have a yellowish color. In contrast, white coatings are generally formulated using non-yellowing crosslinkers, or only a small amount of a yellowing crosslinker.

Preferred curing agents are substantially free of mobile or bound BPA and BADGE and more preferably completely free of mobile or bound BPA and BADGE. Suitable examples of such curing agents are hydroxyl-reactive curing resins such as phenoplasts, aminoplast, blocked or unblocked isocyanates, or mixtures thereof.

Suitable phenoplast resins include the condensation products of aldehydes with phenols. Formaldehyde and acetaldehyde are preferred aldehydes. Various phenols can be employed such as phenol, cresol, p-phenylphenol, p-tert-butylphenol, p-tert-amylphenol, cyclopentylphenol, and compounds of Formula (III) or any other polyhydric phenols disclosed herein.

Suitable aminoplast resins are the condensation products of aldehydes such as formaldehyde, acetaldehyde, crotonaldehyde, and benzaldehyde with amino- or amido-group-containing substances such as urea, melamine, and benzoguanamine. Examples of suitable aminoplast crosslinking resins include, without limitation, benzoguanamine-formaldehyde resins, melamine-formaldehyde resins, etherified melamine-formaldehyde, and urea-formaldehyde resins.

Examples of other generally suitable curing agents are the blocked or non-blocked aliphatic, cycloaliphatic or aromatic di-, tri-, or poly-valent isocyanates, such as hexamethylene diisocyanate, cyclohexyl-1,4-diisocyanate, and the like. Further non-limiting examples of generally suitable blocked isocyanates include isomers of isophorone diisocyanate, dicyclohexylmethane diisocyanate, toluene diisocyanate, diphenylmethane diisocyanate, phenylene diisocyanate, tetramethyl xylene diisocyanate, xylylene diisocyanate, and mixtures thereof. In some embodiments, blocked isocyanates are used that have an Mn of at least about 300, more preferably at least about 650, and even more preferably at least about 1,000.

Polymeric blocked isocyanates are useful in certain embodiments. Some examples of suitable polymeric blocked isocyanates include a biuret or isocyanurate of a diisocyanate, a trifunctional "trimer," or a mixture thereof. Examples of suitable blocked polymeric isocyanates include TRIXENE BI 7951, TRIXENE BI 7984, TRIXENE BI 7963, TRIXENE BI 7981 (TRIXENE materials are available from Baxenden Chemicals, Ltd., Accrington, Lancashire, England), DESMODUR BL 3175A, DESMODUR BL3272, DESMODUR BL3370, DESMODUR BL 3475, DESMODUR BL 4265, DESMODUR PL 340, DESMODUR VP LS 2078, DESMODUR VP LS 2117, and DESMODUR VP LS 2352 (DESMODUR materials are available from Bayer Corp., Pittsburgh, Pa., USA), or combinations thereof. Examples of suitable trimers may include a trimerization product prepared from on average three diisocyanate molecules or a trimer prepared from on average three moles of diisocyanate (e.g., HMDI) reacted with one mole of another compound such as, for example, a triol (e.g., trimethylolpropane).

The level of curing agent (e.g., crosslinker) used will typically depend on the type of curing agent, the time and temperature of the bake, the molecular weight of the binder polymer, and the desired coating properties. If used, the crosslinker is typically present in an amount of up to 50 wt-%, preferably up to 30 wt-%, and more preferably up to 15 wt-%. If used, a crosslinker is preferably present in an amount of at least 0.1 wt-%, more preferably at least 1 wt-%, and even more preferably at least 1.5 wt-%. These weight percentages are based upon the total weight of the resin solids in the coating composition.

In some embodiments, the coating composition of the present invention are "formaldehyde-free" coatings that include, or liberate as a result of curing, no greater than 1% by weight formaldehyde, no greater than 0.5% by weight formaldehyde, no greater than 0.25% by weight formaldehyde, or no greater than 5 ppm formaldehyde. The absence of phenolic resin and/or melamine is believed to contribute to a coating composition that is appreciably free of formaldehyde.

As previously discussed, in some embodiments, the coating composition of the present invention includes an acrylic component which may optionally be covalently attached to the polyether polymer described herein. In some embodiments, the acrylic component may be present as a separate polymer blended with the polyether polymer (in addition to any acrylic component that may optionally be covalently attached to the polyether polymer).

The coating composition of the present invention may include any amount of acrylic component suitable to produce the desired film or coating properties. In some acrylic-component-containing embodiments, the coating composition includes an amount of acrylic component of at least about 5 wt-%, more preferably at least about 10 wt-%, and even more preferably at least about 15 wt-%, as determined by an amount of a monomer mixture used to prepare the acrylic component and based on the total weight of resin solids in the coating system. In such embodiments, the coating composition preferably includes an amount of acrylic component of less than about 95 wt-%, more preferably less than about 75 wt-%, and even more preferably less than about 30 to 40 wt-%, as determined by an amount of a monomer mixture used to prepare the acrylic component and based on the total weight of resin solids in the coating system.

In certain water-based embodiments in which at least some of the acrylic component is covalently attached to the polyether polymer, at least a portion of the acrylic monomers used to form the acrylic component are preferably capable of rending the polyether polymer dispersible in water. In such embodiments, the acrylic component is preferably formed from an ethylenically unsaturated monomer mixture that includes one or more $\alpha,\beta$-unsaturated carboxylic acid. The one or more $\alpha,\beta$-unsaturated carboxylic acid preferably renders the polymer water-dispersible after neutralization with a base. Suitable $\alpha,\beta$-unsaturated carboxylic acid monomers include, for example, acrylic acid, methacrylic acid, crotonic acid, itaconic acid, maleic acid, mesaconic acid, citraconic acid, sorbic acid, fumaric acid, and mixtures thereof. The acrylic monomer also can include, for example, acrylamide or methacrylamide, which can render the polymer water dispersible. Preferred acrylic components for use in packaging coating applications are substantially free, or completely free, of acrylamide- or methacrylamide-type monomers.

The acrylic monomers used to form the acrylic component can include 0% up to about 95%, by total weight of monomers, of vinyl monomers.

The acrylic component preferably includes one or more non-functional monomers and one or more functional monomers (more preferably acid-functional monomers, and even more preferably acid-functional acrylic monomers). In presently preferred embodiments, the acrylic component includes one or more vinyl monomers. The acrylic component is preferably prepared through chain-growth polymerization using one or more ethylenically unsaturated monomers.

Examples of suitable ethylenically unsaturated non-functional monomers such as styrene, halostyrenes, $\alpha$-methylstyrene, alkyl esters of acrylic acid (e.g., methyl acrylate, ethyl acrylate, butyl acrylate, etc.), alkyl esters of methacrylic acid and/or crotonic acid (e.g., methyl, ethyl, propyl, butyl, pentyl, hexyl, octyl, decyl, dodecyl methacrylates and crotonates), vinyl cyclohexane, vinyl cyclooctane, vinyl cyclohexene, hexanediol diacrylate, dimethyl maleate, dibutyl fumarate and similar diesters, vinyl naphthalene, vinyl toluene, vinyl acetate, vinyl propionate, vinyl cyclooctane, ally methacrylate, 2-ethylhexyl acrylate, and diesters of maleic anhydride. Preferred non-functional monomers include styrene, ethyl acrylate, butyl methacrylate, and combinations thereof.

Examples of functional monomers include $\alpha,\beta$-unsaturated carboxylic acids such as, e.g., those previously described; amide-functional monomers; hydroxy-functional monomers (e.g., hydroxyalkyl acrylate or methacrylate monomers such as hydroxyethyl acrylate (HEA), hydroxyethyl methacrylate (HEMA), hydroxypropyl acrylate (HPA), hydroxypropyl methacrylate (HPMA), etc.); oxirane-functional monomers (e.g., glycidyl acrylate and glycidyl methacrylate) and variations and combinations thereof. Preferred non-functional monomers include styrene, ethyl acrylate, butyl methacrylate, and combinations thereof. Preferred functional monomers include acrylic acid, methacrylic acid, and combinations thereof.

The combination and/or ratio(s) of the above monomers of the acrylic component may be adjusted to provide a desired coating or film property. Preferably, at least a portion of the above monomers of the acrylic component are capable of rendering the resin system dispersible in an aqueous carrier. Examples of monomers capable of rendering the resin system dispersible in an aqueous carrier include acid-functional monomers that form salt groups upon neutralization with a base.

While not intending to be bound by theory, it is believed that, for certain embodiments of the present invention, the glass transition temperature (Tg) of the acrylic component is a factor that can contribute to coating compositions exhibiting suitable resistance to retort processes associated with certain food and beverage products. In general, the Fox equation may be employed to calculate the theoretical Tg of the acrylic component. In some embodiments, the acrylic component has a Tg of at least about 40° C., preferably at least about 60° C., more preferably at least about 80° C., and even more preferably at least about 90° C. By way of example, a water-dispersible polymer having an E-L-A described previously herein can include an acrylic component having such a Tg. The acrylic component preferably has a Tg of less than about 280° C., more preferably less than about 220° C., even more preferably less than about 180° C., even more preferably less than about 160° C., and optimally less than about 150° C. In some embodiments, the acrylic component has a Tg of less than about 130° C., or less than about 120° C. In some embodiments, the acrylic component has a Tg greater than about 100° C., more preferably from about 100° C. to about 120° C.

In other embodiments, it may be beneficial to use an acrylic component having a Tg of less than 50° C., 40° C., or even less than 30° C. For example, in certain embodiments in which high resistance to retort processing conditions is not a requirement, such an acrylic component may be used to confer one or more other desired properties.

A coating composition of the present invention may also include other optional polymers that do not adversely affect the coating composition or a cured coating composition resulting therefrom. Such optional polymers are typically included in a coating composition as a filler material, although they can also be included, for example, as a binder polymer, a crosslinking material, or to provide desirable properties. One or more optional polymers (e.g., filler polymers) can be included in a sufficient amount to serve an intended purpose, but not in such an amount to adversely affect a coating composition or a cured coating composition resulting therefrom.

Such additional polymeric materials can be nonreactive, and hence, simply function as fillers. Such optional nonreactive filler polymers include, for example, polyesters, acrylics, polyamides, polyethers, and novalacs. Alternatively, such additional polymeric materials or monomers can be reactive with other components of the composition (e.g., an acid-functional or unsaturated polymer). If desired, reactive polymers can be incorporated into the compositions of the present invention, to provide additional functionality for various purposes, including crosslinking or dispersing the polymer of the present invention into water. Examples of such reactive polymers include, for example, functionalized polyesters, acrylics, polyamides, and polyethers. Preferred optional polymers are substantially free or essentially free of mobile BPA and BADGE, and more preferably essentially completely free or completely free of mobile and bound such compounds.

One preferred optional ingredient is a catalyst to increase the rate of cure. Examples of catalysts, include, but are not limited to, strong acids (e.g., phosphoric acid, dodecylbenzene sulphonic acid (DDBSA), available as CYCAT 600 from Cytec, methane sulfonic acid (MSA), p-toluene sulfonic acid (pTSA), dinonylnaphthalene disulfonic acid (DNNDSA), and triflic acid); quaternary ammonium compounds; phosphorous compounds; and tin, titanium, and zinc compounds. Specific examples include, but are not limited to, a tetraalkyl ammonium halide, a tetraalkyl or tetraaryl phosphonium iodide or acetate, tin octoate, zinc octoate, triphenylphosphine, and similar catalysts known to persons skilled in the art. If used, a catalyst is preferably present in an amount of at least 0.01 wt-%, and more preferably at least 0.1 wt-%, based on the weight of nonvolatile material in the coating composition. If used, a catalyst is preferably present in an amount of no greater than 3 wt-%, and more preferably no greater than 1 wt-%, based on the weight of nonvolatile material in the coating composition.

Another useful optional ingredient is a lubricant (e.g., a wax), which facilitates manufacture of fabricated metal articles (e.g., closures and food or beverage can ends) by imparting lubricity to sheets of coated metal substrate. Non-limiting examples of suitable lubricants include, for example, natural waxes such as Carnauba wax or lanolin wax, polytetrafluoroethane (PTFE) and polyethylene-type lubricants. If used, a lubricant is preferably present in the coating composition in an amount of at least 0.1 wt-%, and preferably no greater than 2 wt-%, and more preferably no greater than 1 wt-%, based on the total weight of nonvolatile material in the coating composition.

Another useful optional ingredient is a pigment, such as titanium dioxide. If used, a pigment is present in the coating composition in an amount of no greater than 70 wt-%, more preferably no greater than 50 wt-%, and even more preferably no greater than 40 wt-%, based on the total weight of solids in the coating composition.

Surfactants can be optionally added to the coating composition, e.g., to aid in flow and wetting of the substrate. Examples of surfactants, include, but are not limited to, nonylphenol polyethers and salts and similar surfactants known to persons skilled in the art. If used, a surfactant is preferably present in an amount of at least 0.01 wt-%, and more preferably at least 0.1 wt-%, based on the weight of resin solids. If used, a surfactant is preferably present in an amount no greater than 10 wt-%, and more preferably no greater than 5 wt-%, based on the weight of resin solids.

In some embodiments, the polyether polymer of the invention is included in a layer of a monolayer or multilayer coating system including a layer incorporating a thermoplastic dispersion (e.g., a halogenated polyolefin dispersion such as, e.g., a polyvinylchloride ("PVC") organosol). In one embodiment, the polyether polymer is included in a primer layer of such a multilayer coating system including another layer (e.g., a top layer) incorporating a thermoplastic dispersion. Such multilayer coating systems are described in the U.S. Provisional Application entitled "Container Coating System" filed on even date herewith. In another embodiment, the polyether polymer is included in the layer incorporating the thermoplastic dispersion, e.g., as a stabilizer for PVC and/or as a co-resin, which is described in the U.S. Provisional Application entitled "Stabilizer and Coating Compositions Thereof" filed on even date herewith.

In some embodiments, the coating composition is "PVC-free." That is, in some embodiments, the coating composition preferably contains less than 2 wt-% of vinyl chloride materials, more preferably less than 0.5 wt-% of vinyl chloride materials, and even more preferably less than 1 ppm of vinyl chloride materials.

The coating composition of the present invention can be present as a layer of a mono-layer coating system or one or more layers of a multi-layer coating system. The coating composition can be used as a primer coat, an intermediate coat, a top coat, or a combination thereof. The coating thickness of a particular layer and the overall coating system will vary depending upon the coating material used, the substrate, the coating application method, and the end use for the coated article. Mono-layer or multi-layer coating systems including one or more layers formed from a coating composition of the present invention may have any suitable overall coating thickness, but will typically have an overall average dry coating thickness of from about 1 to about 60 microns and more typically from about 2 to about 15 microns. Typically, the average total coating thickness for rigid metal food or beverage can applications will be about 3 to about 10 microns. Coating systems for closure applications may have an average total coating thickness up to about 15 microns. In certain embodiments in which the coating composition is used as an interior coating on a drum (e.g., a drum for use with food or beverage products), the total coating thickness may be approximately 25 microns.

The coating composition of the present invention may be applied to a substrate either prior to, or after, the substrate is formed into an article (such as, for example, a food or beverage container or a portion thereof). In one embodiment, a method is provided that includes: applying a coating composition described herein to a metal substrate (e.g., applying the composition to the metal substrate in the form of a planar coil or sheet), hardening the composition, and forming (e.g., via stamping) the substrate into a packaging container or a portion thereof (e.g., a food or beverage can or a portion thereof). For example, riveted beverage can ends having a cured coating of the present invention on a surface thereof can be formed in such a process. In another embodiment, the coating composition is applied to a preformed metal food or beverage can, or a portion thereof. For example, in some embodiments, the coating composition is spray applied to an interior surface of a preformed food or beverage can (e.g., as typically occurs with "two-piece" food or beverage cans). After applying the coating composition onto a substrate, the composition can be cured using a variety of processes, including, for example, oven baking by either conventional or convectional methods, or any other method that provides an elevated temperature suitable for curing the coating. The curing process may be performed in either discrete or combined steps. For example, substrates can be dried at ambient temperature to leave the coating compositions in a largely un-crosslinked state. The coated substrates can then be heated to fully cure the compositions. In certain instances, coating compositions of the present invention can be dried and cured in one step.

The cure conditions will vary depending upon the method of application and the intended end use. The curing process may be performed at any suitable temperature, including, for example, oven temperatures in the range of from about 100° C. to about 300° C., and more typically from about 177° C. to about 250° C. If metal coil is the substrate to be coated, curing of the applied coating composition may be conducted, for example, by heating the coated metal substrate over a suitable time period to a peak metal temperature ("PMT") of preferably greater than about 350° F. (177° C.). More preferably, the coated metal coil is heated for a suitable time period (e.g., about 5 to 900 seconds, more typically about 5 to 30 seconds) to a PMT of at least about 425° F. (218° C.).

The coating compositions of the present invention are particularly useful for coating metal substrates. The coating compositions may be used to coat packaging articles such as a food or beverage container, or a portion thereof. In preferred embodiments, the container is a food or beverage can and the surface of the container is the surface of a metal substrate. The polymer can be applied to a metal substrate either before or after the substrate is formed into a can (e.g., two-piece cans, three-piece cans) or portions thereof, whether it be a can end or can body. Preferred polymers of the present invention are suitable for use in food-contact situations and may be used on the inside of such cans. They are particularly useful on the interior of two-piece or three-piece can ends or bodies.

The metal substrate used in forming rigid food or beverage cans, or portions thereof, typically has a thickness in the range of about 0.005 inches to about 0.025 inches. Electro tinplated steel, cold-rolled steel, and aluminum are commonly used as metal substrates for food or beverage cans, or portions thereof. In embodiments in which a metal foil substrate is employed in forming, e.g., a packaging article, the thickness of the metal foil substrate may be even thinner that that described above.

The coating compositions of the present invention may be suitable, for example, for spray coating, coil coating, wash coating, sheet coating, and side seam coating (e.g., food can side seam coating). A further discussion of such application methods is provided below. It is contemplated that coating compositions of the present invention may be suitably used in each of these application methods discussed further below, including the end uses associated therewith.

Spray coating includes the introduction of the coated composition into the inside of a preformed packaging container. Typical preformed packaging containers suitable for spray coating include food cans, beer and beverage containers, and the like. The spray process preferably utilizes a spray nozzle capable of uniformly coating the inside of the preformed packaging container. The sprayed preformed container is then subjected to heat to remove any residual carriers (e.g., water or solvents) and harden the coating.

In one embodiment, the coating composition of the present invention is a water-based "inside spray" coating suitable for spray application to the interior surfaces of a two-piece food or beverage can, which preferably includes from about 15 to about 40 wt-% of nonvolatile materials, more preferably 15 to 25 wt-% nonvolatile materials for inside spray for two-piece beer and beverage cans.

A coil coating is described as the coating of a continuous coil composed of a metal (e.g., steel or aluminum). Once coated, the coating coil is subjected to a short thermal, ultraviolet, and/or electromagnetic curing cycle, for hardening (e.g., drying and curing) of the coating. Coil coatings provide coated metal (e.g., steel and/or aluminum) substrates that can be fabricated into formed articles, such as two-piece drawn food cans, three-piece food cans, food can ends, drawn and ironed cans, beverage can ends, and the like. In one embodiment, the coating composition of the present invention is a water-based coating composition that is applied to aluminum or steel coating from which riveted beverage can ends are subsequently fabricated.

A wash coating is commercially described as the coating of the exterior of two-piece drawn and ironed ("D&I") cans with a thin layer of protectant coating. The exterior of these D&I cans are "wash-coated" by passing pre-formed two-piece D&I cans under a curtain of a coating composition. The cans are inverted, that is, the open end of the can is in the "down" position when passing through the curtain. This curtain of coating composition takes on a "waterfall-like" appearance. Once these cans pass under this curtain of coating composition, the liquid coating material effectively coats the exterior of each can. Excess coating is removed through the use of an "air knife." Once the desired amount of coating is applied to the exterior of each can, each can is passed through a thermal, ultraviolet, and/or electromagnetic curing oven to harden (e.g., dry and cure) the coating. The residence time of the coated can within the confines of the curing oven is typically from 1 minute to 5 minutes. The curing temperature within this oven will typically range from 150° C. to 220° C.

A sheet coating is described as the coating of separate pieces of a variety of materials (e.g., steel or aluminum) that have been pre-cut into square or rectangular "sheets." Typical dimensions of these sheets are approximately one square meter. Once coated, the coating is hardened (e.g., dried and cured) and the coated sheets are collected and prepared for subsequent fabrication. Sheet coatings provide coated metal (e.g., steel or aluminum) substrate that can be successfully fabricated into formed articles, such as two-piece drawn food cans, three-piece food cans, food can ends, drawn and ironed cans, beverage can ends (including, e.g., riveted beverage can ends having a rivet for attaching a pull tab thereto), and the like. In one embodiment, the coating composition of the present invention is a solvent-based coating composition that is applied to steel or aluminum sheets that are subsequently fabricated into the above described packaging articles.

A side seam coating is described as the application of a powder coating or the spray application of a liquid coating over the welded area of formed three-piece food cans. When three-piece food cans are being prepared, a rectangular piece of coated substrate is formed into a cylinder. The formation of the cylinder is rendered permanent due to the welding of each side of the rectangle via thermal welding. Once welded, each can typically requires a layer of coating, which protects the exposed "weld" from subsequent corrosion or other effects to the contained foodstuff. The coatings that function in this role are termed "side seam stripes." Typical side seam stripes are spray applied and cured quickly via residual heat from the welding operation in addition to a small thermal, ultraviolet, and/or electromagnetic oven.

Other commercial coating application and curing methods are also envisioned, for example, electrocoating, extrusion coating, laminating, powder coating, and the like.

In certain preferred embodiments, the coating composition of the present invention is capable of exhibiting one or more (and in some embodiments all) of the following coating properties: good blush resistance, good corrosion resistance, good stain resistance, good flexibility (e.g., good resistance to drop can damage, suitability for use as a beverage can end coating, etc), and good adhesion to metal substrate), when subjected to the testing described below in Examples.

The polymer of the present invention can be used in powder coating applications, e.g., for use in forming an adherent polymeric coating. Thus, in some embodiments, the coating composition of the present invention is a powder coating composition that preferably does not include a liquid carrier (although it may include trace amounts of residual water or organic solvent). The powder coating composition is preferably in the form of a finely divided, free flowing powder. In preferred embodiments, the powder composition is a thermosettable powder composition that forms a thermoset coating when suitably cured. The discussion that follows relates to powder coating embodiments of the present invention.

The powder coating composition of the present invention may be particularly useful in end uses in which a coated substrate is intended to contact substances for consumption by humans or intimate contact with humans. For example, the powder coating compositions may be used to coat: surfaces of food or beverage containers, cosmetic containers, or medicinal containers; surfaces of valves and fittings, including surfaces intended for contact with potable water or other consumable liquids; surfaces of pipes, including internal surfaces of water pipes or other liquid conveying pipes; and surfaces of tanks, including internal surfaces of water tanks such as bolted steel tanks. For powder coatings that will contact potable water, the cured powder coating composition should preferably comply with ANSI/NSF standard 61. Some examples of fittings include articles for use in liquid conveying systems (e.g., for use in conveying potable water) such as connectors (e.g., threaded or flanged connectors), elbows, flow splitters (e.g., T-fittings, etc.), backflow preventers, pipe end caps, and the like.

The powder coating composition preferably includes at least a film-forming amount of the polymer of the present invention, which in preferred embodiments is a polyether polymer having segments of Formula (I). In order to facilitate stability of the powder coating composition during storage prior to use, a polymer of the present invention is preferably selected that has a Tg of at least about 40° C., more preferably at least about 50° C., and even more preferably at least about 60° C. The powder coating composition preferably includes at least about 50 wt-%, more preferably at least 70 wt-%, and even more preferably at least 90 wt-% of the polymer of the present invention, based on total resin solids.

Powder coating compositions typically utilize binder polymers having a different molecular weight (typically a lower molecular weight) than those of liquid packaging coating compositions for use on metal food or beverage cans. When used in powder coating compositions, the polymer of the present invention preferably has a number average molecular weight (Mn) of at least about 1,000, more preferably at least about 1,200, and even more preferably at least about 1,500. In such applications, the polymer of the present invention preferably has an Mn of less than about 6,000, more preferably less than about 5,000, and even more preferably less than about 4,000.

The powder coating composition preferably includes at least one base powder that includes the polymer of the present invention. The base powder may further include one or more optional ingredients, which may include any suitable ingredients disclosed herein. The base powder preferably includes the polymer of the present invention as a major component on a weight basis, and more preferably includes at least 50 wt-% of the polymer. In some embodiments, the polymer of the present invention comprises all or substantially all of the base powder.

The particles of the base powder may be of any suitable size. Preferably, the particles of the base powder exhibit a particle size diameter of from about 1 micron to about 200 microns, more preferably from about 10 to about 150 microns.

The base powder may exhibit any suitable distribution of particle sizes. In some embodiments, the median particle size of the base powder is preferably at least about 20 microns, more preferably at least about 30 microns, and even more preferably at least about 40 microns. In some embodiments, the median particle size is preferably less than about 150 microns, more preferably less than about 100 microns, and even more preferably less than about 60 microns. The median particle sizes referenced in this paragraph are median diameter particle sizes expressed on a volume basis, which may be determined, for example, via laser diffraction.

Powder compositions of the present invention may also contain one or more other optional ingredients. The optional ingredients preferably do not adversely affect the powder compositions or articles formed therefrom. Such optional ingredients may be included, for example, to enhance aesthetics; to facilitate manufacturing, processing, and/or handling of powder compositions or articles formed therefrom; and/or to further improve a particular property of powder compositions or articles formed therefrom. Each optional ingredient is preferably included in a sufficient amount to serve its intended purpose, but not in such an amount to adversely affect a powder composition or a cured coating resulting therefrom. The one or more optional ingredients may be present in a same or different particle than the polymer of the present invention, or a combination thereof. In preferred embodiments, one or more optional ingredients are present in the particles of the base powder along with the polymer of the present invention. If present in particles other than those of the base powder, the particles of the optional ingredient(s) preferably have a particle size in the general range of the particles sizes of the base powder.

The powder composition preferably includes one or more optional curing agents (e.g., crosslinkers). Suitable curing agents may include phenolic crosslinkers, preferably BPA-free phenolic crosslinkers; dicyandiamide, which may be optionally substituted; carboxyl-functional compounds such as, e.g., carboxyl-functional polyester resins or carboxyl-functional acrylic resins; and combinations thereof. The powder composition may include any suitable amount of the one or more crosslinkers. In some embodiments, crosslinker is present in the powder composition in an amount of up to about 15 wt-%, preferably up to about 10 wt-%, and more preferably up to about 5 wt-%, based on the total weight of the powder coating composition. If used, crosslinker is preferably present in an amount of at least about 0.1 wt-%, more preferably at least about 0.5 wt-%, and even more preferably at least about 1 wt %, based on the total weight of the powder coating composition.

An optional cure accelerator may be present in the powder coating composition to facilitate cure. When used, the powder coating composition typically includes from about 0.1 wt-% to about 3 wt-% of one or more cure accelerators. 2-methylimidazole is an example of a preferred cure accelerator. Other suitable cure accelerators may include imidazoles, phosphonium salts, tertiary amines, quaternary ammonium salts, anhydrides, polyamides, aliphatic amines, epoxy resin-amine adducts, and combinations thereof.

The powder coating composition may optionally include one or more flow control agents to improve the flow, wetting, and/or leveling properties of the cured film. If used, flow control agents are typically present in an amount of about 0.01 wt-% to about 5 wt-%, more typically from about 0.2 wt-% to about 2 wt-%, based on the total weight of the powder coating composition. Examples of suitable flow control agents include polyacrylates such as poly(2-ethylhexyl acrylate) and various co-polymers of 2-ethylhexyl acrylate.

The powder coating composition may optionally include one or more fluidizing agents to facilitate the preparation of a free-flowing powder composition. If used, fluidizing agent is typically present in an amount of about 0.01 wt-% to about 5 wt-%, more typically from about 0.05 wt-% to about 0.5 wt-%, based on the total weight of the powder coating composition. Suitable fluidizing agents include, for example, fumed silicas of a suitable particle size. Such fluidizing agents may preferably be added after the melt blending process, such as to the extruded flake before or after grinding.

Inorganic filler and/or colored pigment may optionally be included in the powder coating compositions. Examples of suitable such materials may include calcium silicates such as, e.g., wollastonite; barium sulfate; calcium carbonate; mica; talc; silica; iron oxide; titanium dioxide; carbon black; phthalocyanines; chromium oxide; and combinations thereof.

The powder coating compositions can be prepared via any suitable methods. In one embodiment, some or all of the ingredients are melt-blended together, which may be accomplished, for example, using conventional single-screw or twin-screw extruders. The temperature of the melt-blending step is preferably controlled to avoid any appreciable cross-linking. Typically, a melt-blending temperature is selected such that the temperature of the molten blend does not exceed about 100° C. to about 150° C. The ingredients may optionally be pre-mixed prior to melt blending. After melt blending and cooling, the resulting blend, which is typically an extrudate, can be processed into powder using conventional milling techniques. The resulting milled powder can optionally be sieved to remove particles falling outside the desired particle size range. The powder can optionally be mixed with one or more additional powders to form the finished powder coating composition. For example, in some embodiments, the milled powder is combined with fluidizing agent powder either before or after optional sieving.

The powder coatings compositions can be applied to substrate using any suitable method. Typically, the substrate is a metal substrate (e.g., cast iron, steel, etc.), which may be bare metal or may be optionally pretreated and/or primed. One suitable such method is the electrostatic spray application of charged powder to substrate. Alternatively, the substrate may be applied, for example, by dipping the substrate in a fluidized powder bed. In a preferred embodiment, the powder is applied to heated substrate that has been heated to between 190° C. and 240° C. Upon contacting the heated metal substrate, the powder melts, reacts, and forms a continuous coating that is preferably smooth and uniform. In another embodiment, the powder is applied to a near ambient temperature substrate and the powder coated substrate is then heated to a temperature sufficient to cause the powder to melt, react, and form a continuous coating that is preferably smooth and uniform.

The melting and curing (e.g., crosslinking) of the powder composition may be performed in combined or discrete heating steps. In presently preferred embodiments, a combined heating step is used in which the powder coating composition is heated to a temperature sufficient to both melt the powder and cure the resulting continuous coating. The bake temperature and the duration of the bake will vary depending upon a variety of factors, including, for example, the end use. For purposes of curing the coating, the bake temperature is typically at least about 150° C., and more typically at least about 200° C. In general, a lower cure temperature may be used if a longer cure time is employed. The cure temperature typically will not exceed about 240° C. The cure time may range, for example, from about 30 seconds to about 30 minutes, depending upon the cure temperature and the end use.

The thickness of the cured powder coating will vary depending upon the particular end use. However, typically the cured powder coating will have an average coating thickness in the range of about 25 to about 1,500 microns, and more typically about 50 to about 500 microns. In some embodiments, an average coating thickness in the range of about 125 to about 300 microns is used.

TEST METHODS

Differential Scanning Calorimetry

Samples for differential scanning calorimetry ("DSC") testing can be prepared by first applying the liquid resin composition onto aluminum sheet panels. The panels are then baked in a Fisher Isotemp electric oven for 20 minutes at 300° F. (149° C.) to remove volatile materials. After cooling to room temperature, the samples are scraped from the panels, weighed into standard sample pans and analyzed using the standard DSC heat-cool-heat method. The samples are equilibrated at −60° C., then heated at 20° C. per minute to 200° C., cooled to −60° C., and then heated again at 20° C. per minute to 200° C. Glass transitions are calculated from the thermogram of the last heat cycle. The glass transition is measured at the inflection point of the transition.

EXAMPLES

The following examples are offered to aid in understanding of the present invention and are not to be construed as limiting the scope thereof. Unless otherwise indicated, all parts and percentages are by weight. The constructions cited were evaluated by tests as follows:

Example 1: Synthesis of the Diglycidyl Ether of 4,4'-(1,4-Phenylenebis(propane-2,2-diyl))diphenol and a Polyether Polymer Therefrom 4,4'-(1,4-Phenylenebis(propane-2,2-diyl))diphenol (51.3 grams, 0.125 moles), epichlorohydrin (140 milliliters, 1.79 moles), and 2-propanol (150 milliliters) is heated to 80° C. in an oil bath. Sodium hydroxide (12.5 grams, 0.313 moles) in water (20 milliliters) is added in portions over 5 minutes. The solution is heated for 2 hours at 80° C. The mixture is cooled to room temperature, filtered, and concentrated on a rotary evaporator at a temperature of about 30-40° C. The remaining oil is mixed with dichloromethane (50 milliliters) and heptane (100 milliliters) and allowed to stir for 30 minutes at ambient temperature. The salts are removed by filtration and the filtrate is concentrated on a rotary evaporator at 30-40° C. The remaining oil is dried under high vacuum at ambient temperature until a constant weight is obtained. The experiment is expected to generate the diglycidyl ether of 4,4'-(1,4-Phenylenebis(propane-2,2-diyl))diphenol (34 grams, 60% yield). The epoxy value is expected to be about 0.44 equivalents per 100 grams.

To a 4-neck round-bottom flask equipped with a mechanical stirrer, a nitrogen inlet to maintain a nitrogen blanket, a water-cooled condenser, and a thermocouple connected to heating control device and a heating mantle is added 30 parts of the diglycidyl ether of 4,4'-(1,4-Phenylenebis(propane-2,2-diyl))diphenol, 20.7 parts of 4,4'-(1,4-Phenylenebis(propane-2,2-diyl))diphenol (or, alternatively, a suitable amount of any other upgrade dihydric phenol such as, e.g., hydroquinone), 0.05 parts polymerization catalyst, and 2.66 parts methylisobutyl ketone. This mixture is heated with stirring to 125° C., allowed to exotherm, and is then heated at 160° C. for 3 hours until the epoxy value is 0.032 eq/100 g. At this point to the mixture is added 48 parts cyclohexanone, while the mixture is cooled to 70° C. The batch is discharged affording a solvent-based polymer with a nonvolatile content of 50% and an Epoxy value of 0.030 eq/100 grams.

A packaging coating composition may be formulated pursuant to the methods and materials included herein using the resulting polyether polymer.

This application incorporates by reference the disclosures of each of the following: International Application No. PCT/US2012/024191 filed on Feb. 7, 2012 and entitled "COATING COMPOSITIONS FOR CONTAINERS AND OTHER ARTICLES AND METHODS OF COATING"; International Application No. PCT/US2012/024193 filed on Feb. 7, 2012 and entitled "COATING COMPOSITIONS FOR CONTAINERS AND OTHER ARTICLES AND METHODS OF COATING"; U.S. application Ser. No. 13/570,632 entitled "COATING COMPOSITIONS FOR CONTAINERS AND OTHER ARTICLES AND METHODS OF COATING" filed on Aug. 9, 2012; U.S. application Ser. No. 13/570,743 "COATING COMPOSITIONS FOR CONTAINERS AND OTHER ARTICLES AND METHODS OF USING SAME" filed on Aug. 9, 2012; and the U.S. Provisional Application 61/681,394 entitled "COATING COMPOSITIONS FOR CONTAINERS AND OTHER ARTICLES AND METHODS OF USING SAME" filed on Aug. 9, 2012.

The complete disclosure of all patents, patent applications, and publications, and electronically available material cited herein are incorporated by reference. The foregoing detailed description and examples have been given for clarity of understanding only. No unnecessary limitations are to be understood therefrom. The invention is not limited to the exact details shown and described, for variations obvious to one skilled in the art will be included within the invention defined by the claims. The invention illustratively disclosed herein suitably may be practiced, in some embodiments, in the absence of any element which is not specifically disclosed herein.

What is claimed is:

1. An article comprising:
   a food or beverage container, or a portion thereof, having:
      a metal substrate; and a coating composition applied on at least a portion of the metal substrate, the coating composition comprising: a polyether polymer that includes at least 25% by weight of aryl or heteroaryl groups, wherein the coating composition contains less than 1,000 parts per million (ppm) of bound bisphenol A, bisphenol F, bisphenol S, polyhydric phenols having estrogenic activity greater than or equal to that of bisphenol S, and epoxides thereof;
   wherein the polyether polymer is formed by reacting ingredients including: (i) an extender and (ii) a diepoxide compound, wherein the extender or diepoxide compound, or both, includes one or more segments of the below Formula (I):

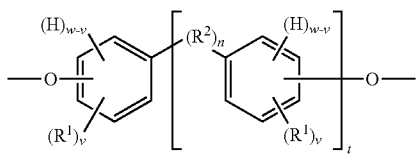

Formula (I)

wherein:
each of the oxygen atoms depicted in Formula (I) is present in an ether or ester linkage;
v is independently 0 to 4 when t is 0 and v is independently 0 to 3 when t is 1;
w is 4;
when t is 1 each of the phenylene groups depicted in Formula (I) includes at least one Hydrogen atom attached to the ring at an ortho position relative to the depicted oxygen atoms;
each $R^1$, if present, is independently an atom or group having an atomic weight of at least 15 Daltons that is substantially non-reactive with an epoxy group;
$R^2$, if present, is a divalent group;
n is 0 or 1; with the proviso that if n is 0, the phenylene groups depicted in Formula (I) can optionally join to form a fused ring system in which case w is 3 and v is 0 to 2;
t is 0 or 1; and
two or more $R^1$ and/or $R^2$ groups can join to form one or more cyclic groups.

2. The article of claim 1, wherein the polyether polymer includes at least 25% by weight of phenylene groups, t is 1 and each of the phenylene groups depicted in Formula (I) includes two Hydrogen atoms attached to the ring at an ortho position relative to the depicted oxygen atom.

3. The article of claim 1, wherein the polyether polymer includes at least 45% by weight of phenylene groups.

4. The article of claim 1, wherein t is 1, n is 1, and $R^2$ is an organic group having 8 or more carbon atoms.

5. The article of claim 1, wherein t is 1, n is 1, and $R^2$ is a segment of the structure —C($R^7$)($R^8$)—, wherein $R^7$ and $R^8$ are each independently a hydrogen atom, a halogen atom, an organic group, a sulfur-containing group, or a nitrogen-containing group, and wherein $R^7$ and $R^8$ can optionally join to form a cyclic group, with the proviso that $R^7$ and $R^8$ are not both —$CH_3$.

6. The article of claim 5, wherein $R^2$ has an atomic weight greater than 200 Daltons.

7. The article of claim 1, wherein t is 1, n is 1, and the ether oxygen atom of each phenylene group depicted in Formula (I) is located at a para position relative to $R^2$.

8. The article of claim 1, wherein the segment of Formula (I) has an atomic weight of less than 600 Daltons.

9. The article of claim 1, wherein the diepoxide compound includes one or more segments of Formula (I).

10. The article of claim 9, wherein the extender comprises hydroquinone, catechol, resorcinol, or a substituted variant thereof.

11. The article of claim 1, wherein the polyether polymer that has a Tg of at least 30° C. prior to cure of the coating composition and includes at least 25 percent by weight of phenylene groups.

12. The article of claim 1, wherein the coating composition comprises at least 10 weight percent, based on the total resin solids of the coating composition, of a polyether polymer having a number average molecular weight of at least 2,000.

13. The article of claim 1, wherein the polyether polymer has a glass transition temperature of at least 60° C. prior to cure of the coating composition.

14. The article of claim 1, wherein the diepoxide compound is not genotoxic and is derived from a dihydric phenol that includes a segment of Formula (I) and exhibits a log Relative Proliferative Effect value in the MCF-7 cell proliferation assay of less than −3.

15. The article of claim 1, wherein the food or beverage container or portion thereof has the coating composition applied as a food-contact coating on an interior surface.

16. The article of claim 1, wherein $R^2$ includes a polar group.

17. The article of claim 16, wherein the polar group comprises a group selected from a ketone, a carboxyl, a carbonate, a hydroxyl, a phosphate, a sulfoxide, or a combination thereof.

18. The article of claim 1, wherein t is 1, n is 1, and each v is 0.

19. The article of claim 18, wherein:
the polyether polymer has a glass transition temperature of at least 30° C. prior to cure of the coating composition and a number average molecular weight of at least 2,000;
the segment of Formula (I) has an atomic weight of less than 600 Daltons; and
each of the oxygen atoms depicted in Formula (I) are present in an ether linkage.

20. The article of claim 19, wherein the extender includes one or more segments of Formula (I) and the diepoxide is an aliphatic diepoxide.

21. The article of claim 19, wherein $R^2$ has one or both of: (i) an atomic weight greater than 200 Daltons or (ii) a polar group selected from a ketone, a carboxyl, a carbonate, a hydroxyl, a phosphate, a sulfoxide, or a combination thereof.

22. The article of claim 1, wherein a mono-layer or multi-layer coating including a layer formed from the coating composition has an overall average dry coating thickness of from about 2 to about 15 microns.

23. The article of claim 1, wherein the polyether polymer does not include any structural units derived from a dihydric phenol that exhibit an estrogenic agonist activity greater than 4,4'-(propane-2,2-diyl)bis(2,6-dibromophenol) in the MCF-7 assay.

24. The article of claim 1, wherein the extender includes one or more segments of Formula (I) and the diepoxide is an aliphatic diepoxide; and wherein the polyether polymer has a number average molecular weight of at least 4,000 and a Tg of at least 80° C.

25. The article of claim 1, wherein the polyether polymer does not include any structural units derived from a dihydric phenol that exhibit an estrogenic agonist activity greater than 4,4'-(propane-2,2-diyl)bis(2,6-dibromophenol) in the MCF-7 assay.

26. The article of claim 1, wherein the polyether polymer includes at least 25% by weight of phenylene groups, t is 1 and each of the phenylene groups depicted in Formula (I) includes two Hydrogen atoms attached to the ring at an ortho position relative to the depicted oxygen atom; and wherein the extender comprises hydroquinone, catechol, resorcinol, or a substituted variant thereof.

27. The article of claim 1, wherein the diepoxide compound is not genotoxic and is derived from a dihydric phenol that includes a segment of Formula (I) and exhibits a log Relative Proliferative Effect value in the MCF-7 cell proliferation assay of less than −3.

28. A method comprising:

providing a metal substrate; and applying on at least a portion of the substrate a coating composition comprising a polyether polymer that includes at least 25% by weight of aryl or heteroaryl groups, wherein the coating composition contains less than 1,000 parts per million (ppm) of bound bisphenol A, bisphenol F, bisphenol S, polyhydric phenols having estrogenic activity greater than or equal to that of bisphenol S, and epoxides thereof;

wherein the polyether polymer is formed by reacting ingredients including: (i) an extender and (ii) a diepoxide compound, wherein the extender or diepoxide compound, or both, includes one or more segments of the below Formula (I):

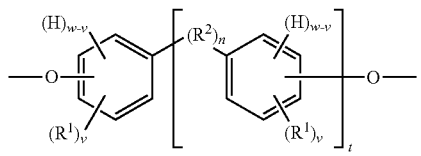

Formula (I)

wherein:

each of the oxygen atoms depicted in Formula (I) is present in an ether or ester linkage;

v is independently 0 to 4 when t is 0 and v is independently 0 to 3 when t is 1;

w is 4;

when t is 1 each of the phenylene groups depicted in Formula (I) includes at least one Hydrogen atom attached to the ring at an ortho position relative to the depicted oxygen atoms;

each $R^1$, if present, is independently an atom or group having an atomic weight of at least 15 Daltons that is substantially non-reactive with an epoxy group;

$R^2$, if present, is a divalent group;

n is 0 or 1; with the proviso that if n is 0, the phenylene groups depicted in Formula (I) can optionally join to form a fused ring system in which case w is 3 and v is 0 to 2;

t is 0 or 1; and two or more $R^1$ and/or $R^2$ groups can join to form one or more cyclic groups.

29. The method of claim 28, further comprising: causing the metal substrate to be formed into a food or beverage container or a portion thereof.

30. The method of claim 28, wherein the metal substrate is formed into a beverage can end.

31. The method of claim 28, wherein the coating composition is spray applied onto an interior surface of a metal food or beverage can that includes a body portion and a bottom end portion.

32. The method of claim 28, wherein the coating composition is a solvent-based coating composition.

33. The method of claim 28, wherein the coating composition is a water-based coating composition.

* * * * *